(12) United States Patent
Smith

(10) Patent No.: US 12,022,356 B2
(45) Date of Patent: *Jun. 25, 2024

(54) SYSTEM AND METHOD OF DETERMINING REAL-TIME LOCATION

(71) Applicants: DENSO International America, Inc., Southfield, MI (US); DENSO CORPORATION, Kariya (JP)

(72) Inventor: Eric J. Smith, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,090

(22) Filed: Aug. 11, 2022

(65) Prior Publication Data

US 2022/0386070 A1    Dec. 1, 2022

Related U.S. Application Data

(63) Continuation of application No. 17/120,740, filed on Dec. 14, 2020, now Pat. No. 11,418,911, which is a continuation of application No. 16/713,361, filed on Dec. 13, 2019, now Pat. No. 10,869,161.

(60) Provisional application No. 62/779,760, filed on Dec. 14, 2018.

(51) Int. Cl.
  *H04W 4/02*   (2018.01)
  *H04W 4/029*  (2018.01)

(52) U.S. Cl.
  CPC .......... *H04W 4/023* (2013.01); *H04W 4/029* (2018.02)

(58) Field of Classification Search
  CPC ..................................................... H04W 4/023
  USPC ....................................................... 455/456.1
  See application file for complete search history.

(56) References Cited

U.S. PATENT DOCUMENTS

| | | | |
|---|---|---|---|
| 10,536,920 B1 | 1/2020 | Desclos et al. | |
| 10,869,161 B2 | 12/2020 | Smith | |
| 2003/0090365 A1 | 5/2003 | Bergerhoff | |
| 2004/0012524 A1 | 1/2004 | Couronne et al. | |
| 2005/0122252 A1 | 6/2005 | Xu et al. | |
| 2005/0201301 A1* | 9/2005 | Bridgelall | H04W 4/203 370/254 |
| 2009/0046013 A1 | 2/2009 | Yanagihara | |
| 2009/0258649 A1* | 10/2009 | Salowey | H04W 52/0258 455/435.2 |
| 2014/0267234 A1* | 9/2014 | Hook | G06T 19/006 345/419 |

(Continued)

OTHER PUBLICATIONS

International Search Report and the Written Opinion of the International Searching Authority for International Application No. PCT/US2019/066246 dated Mar. 24, 2020.

*Primary Examiner* — Joel Ajayi
(74) *Attorney, Agent, or Firm* — Warner Norcross + Judd LLP

(57) ABSTRACT

A system and method for determining location information of a portable device relative to an object based on an environment of the object is provided. The system and method may determine an environment of the object based on a received signal characteristic of communications transmitted from a first object device disposed on the object. Based on the determined type of environment or a characteristic thereof, a locator or an adapter, or both, may be selected for determining location information about a portable device relative to the object.

27 Claims, 13 Drawing Sheets

(56) References Cited

U.S. PATENT DOCUMENTS

| | | |
|---|---|---|
| 2015/0172870 A1 | 6/2015 | Venkatesan et al. |
| 2018/0213355 A1 | 7/2018 | Smith et al. |
| 2021/0185478 A1 | 6/2021 | Smith |

* cited by examiner

SYSTEM AND METHOD OF DETERMINING REAL-TIME LOCATION

FIELD OF THE INVENTION

The present application relates to a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS system in the automotive realm includes a transceiver or master controller located within a vehicle and capable of communicating via radio frequency (RF) with a portable device. One or more aspects of the communications between the master controller and the portable device, such as signal strength of the communications, may be monitored and used as a basis for determining a location of the portable device relative to the vehicle. For instance, if the signal strength of communications is low, the portable device may be farther away from the vehicle relative to communications where the signal strength is high. In general, the strength of communications drops off as the distance increases between the portable device and the vehicle.

Using a function based on the relationship between signal strength and distance, the location of the portable device relative to the vehicle can be computed. However, the accuracy of the function is likely to vary significantly from application to application and among different environments. A function may be considered accurate for one system under set conditions, and then provide a result that is significantly inaccurate under different conditions or with a slightly different system. Such inaccuracies under varying conditions may negatively affect the user's experience and lead to use of alternative conventional systems based on key fobs that are currently more established than Phone as a Key (PaaK) systems based on an RTLS system.

SUMMARY

A system and method for determining location information of a portable device relative to an object based on an environment of the object is provided. The system and method may determine an environment of the object based on a received signal characteristic of communications transmitted from a first object device disposed on the object. As an example, the received signal characteristic may be determined by a second object device disposed on the object, such as a sensor device disposed on the object and configured to receive the wireless communications transmitted from the first object device. As another example, the received signal characteristic may be determined by a portable device separate from the object and configured to receive the wireless communications transmitted from the first object device. Based on the determined type of environment or a characteristic thereof, a locator or an adapter, or both, may be selected for determining location information about a portable device relative to the object.

In one embodiment, a system is provided for determining location information pertaining to a location of a portable device relative to an object. The system may include a fixed position device and a controller. The fixed position device may be disposed in a fixed position relative to the object, and may include an antenna configured to communicate wirelessly with the portable device via a communication link. The controller may be configured to determine location information about the portable device relative to the object. The controller may include a first locator configured to provide location information about the portable device relative to the object in a first environment, where the first locator determines the location information based on a signal characteristic of communications wirelessly transmitted between the portable device and the fixed position device. The controller may include a second locator configured to provide location information about the portable device relative to the object in a second environment, where the second locator determines the location information based on a signal characteristic of communications wirelessly transmitted from the portable device to the fixed position device.

In one embodiment, the controller is configured to select at least one of said first locator and said second locator to determine location information based on an environment of the object, and to determine the environment of the object, where the environment of the object is determined based on a received signal characteristic with respect to wireless communications transmitted from said fixed position device.

In one embodiment, the second locator is an adapter locator configured to affect an output of the first locator based on one or more adapter locator parameters.

A method for determining location information pertaining to a location of a portable device relative to an object is provided in one embodiment. The method may include providing a fixed position device in a fixed position relative to the object, and transmitting, from the fixed position device, wireless communications. A received signal characteristic may be sensed with respect to the wireless communications transmitted from the fixed position device, and an environment of the object may be determined based on the received signal characteristic. The method may include selecting at least one of a first locator and a second locator based on the determined environment of the object, where the first locator and the second locator are configured to determine the location information pertaining to the portable device relative to the object based on wireless communications transmitted from the portable device.

In one embodiment, the method may include receiving the wireless communications transmitted from the portable device, and determining, with the at least one selected locator, the location information based on the wireless communications transmitted from the portable device.

In one embodiment, the method may include selecting the first locator based on the determined environment being a first environment, and selecting the second locator based on the determined environment being a second environment. The second locator may be an adapter locator configured to affect an output of the first locator, such that selecting the second locator includes selecting the first locator.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
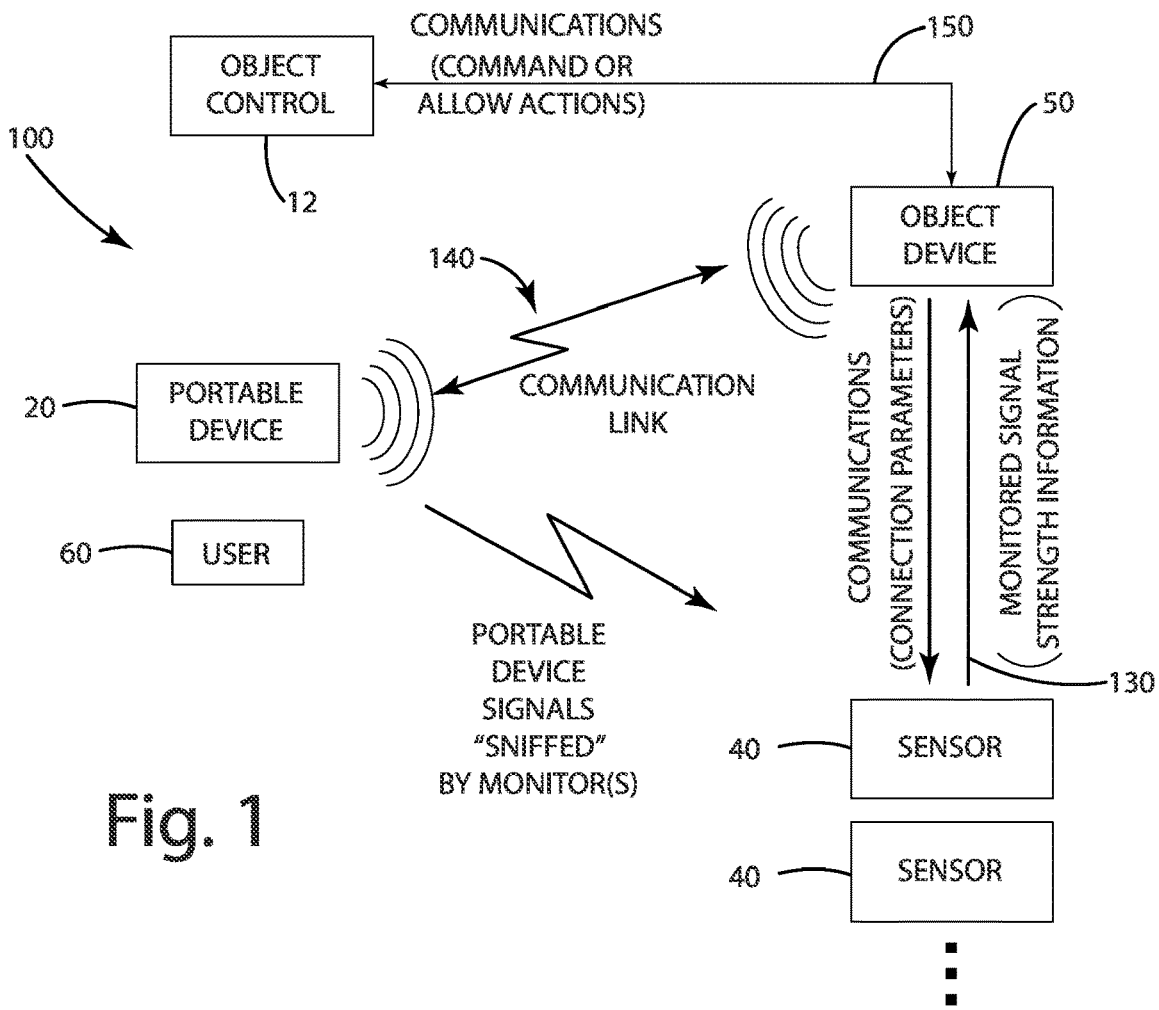
FIG. 1 shows a representative view of a system in accordance with one embodiment.

A system and method for determining location information of a portable device relative to an object based on an environment of the object is provided. The system and method may determine an environment of the object based on a received signal characteristic of communications transmitted from a first object device disposed on the object. As an example, the received signal characteristic may be determined by a second object device disposed on the object, such as a sensor device disposed on the object and configured to receive the wireless communications transmitted from the first object device. As another example, the received signal characteristic may be determined by a portable device separate from the object and configured to receive the wireless communications transmitted from the first object device.

The object in one embodiment may be mobile, such that its environment may change depending on the location of the object. For instance, in the case of the object being a vehicle, the vehicle may be stored in an enclosed garage with a movable barrier at night, and then driven to and parked in an open-air parking lot, with one or more other vehicles in proximity thereto. The environmental configuration of these two different locations can vary in significant ways relative to RF or wireless communications. The enclosed space of the garage may reflect RF communications in close proximity to the vehicle, potentially leading to greater signal strength of the RF communications relative to the vehicle than would otherwise occur without the reflections, such as in the case of an open air parking lot with no other vehicles in proximity to the vehicle. If signal strength of communications is used as a basis for determining a location of a portable device relative to the vehicle, the environmental change from a garage to an open-air parking lot can lead to inconsistent location determinations unless the determination is based on the environmental change or state. One embodiment in accordance with the present disclosure is configured to determine location information about a portable device relative to an object based on the environmental state of the object.

In one embodiment, a locator may be provided to determine the location information about the portable device relative to the object based on a signal characteristic of communications with the portable device. It should be understood that the present disclosure is not limited to determining the location information based on a signal characteristic of communications; one or more additional signal characteristics of the communications may be used as a basis by the locator to determine the location information.

The locator may include a core function operable in conjunction with one or more parameters to determine the location information based on at least one signal characteristic of wireless communications. The values of the one or more parameters may be selected to yield location information for the portable device relative to the object with a degree of confidence for a given environment. For instance, the locator may be configured to determine the location of the portable device relative to the object in an open-air parking lot with no vehicles in proximity thereto or within 4 inches with a degree of confidence of 90% or better. In one embodiment, selecting the values of the one or more parameters may be based on empirical analysis, including obtaining truth data pertaining to an actual location of the portable device relative to the object along with, for each actual location, at least one sample of at least one signal characteristic. As discussed herein, the system may include a plurality of sensors disposed at different locations on the object, such that a plurality of signal characteristics of the wireless communications can be obtained with respect to different positions on the object. The plurality of signal characteristics may be correlated with truth data pertaining to an actual location of the portable device relative to the object, and one or more parameters in conjunction with the core location function may be trained or selected to yield location information that approximates the truth data within a degree of confidence.

In one embodiment, the system may utilize a plurality of locators, one for each type or class of environment. A first locator may be trained to yield location information based on truth data obtained for a first environment, and a second locator may be trained to yield location information based on truth data obtained for a second environment. In one example, the first environment may be an open-air parking lot, and the second environment may be an enclosed garage.

It is noted that an environment for which a locator is trained may not remain static. For instance, in general, one type of open-air parking lot will be similar to another open-air parking lot, assuming no vehicles in proximity to the vehicle are fitted with the system in accordance with one embodiment. However, as noted, the system may be trained with no other vehicles in proximity to the vehicle—this is unlikely to be the case in use. Many times, one or more other vehicles may be parked alongside or in proximity of the vehicle fitted with the system. In one embodiment, the locator may be configured to yield location information within an acceptable degree of confidence despite such variations in the environment relative to the environment on which the locator was trained or configured for operation. Alternatively, the locator operates in conjunction with an adapter locator, as discussed herein to facilitate yielding location information within an acceptable degree of confidence.

In one embodiment, the system may utilize a first locator for a first environment, and the first locator in conjunction with an adapter locator for a second environment. The first environment may be similar in some aspects to the second environment but having one or more features that can affect RF communications differently than those of the first environment. For instance, the first environment may be an open-air parking lot with no vehicles in proximity to the vehicle fitted with the system, and the second environment may be a similar open air parking lot but with one or more vehicles in proximity to the vehicle that affect RF communications. As discussed, herein, these one or more vehicles in proximity to the vehicle may reflect or absorb, or both, RF communications thereby affecting the RF communications in a manner different from the first environment without the one or more vehicles in proximity to the vehicle.

As another example, the second environment may share even fewer similarities with the first environment. For instance, the second environment may be an enclosed garage with a movable barrier, while the first environment is an open-air parking lot with no vehicles in proximity to the vehicle fitted with the system. The second environment in this example may include walls or other objects, or both that affect RF communications (e.g., by reflectance or absorption, or both) in a manner differently from the RF communications in the first environment.

The system in accordance with one embodiment may be configured to determine a locator configuration for determining a location of the portable device based on a received signal characteristic of wireless or RF communications transmitted from a fixed position device disposed on the object. For, instance, the fixed position device may be the object device or a sensor device disposed on the object. The RF communications may be received by another fixed position device, such as the object device or a sensor device, or both, or the portable device, or a combination thereof, and the received signal characteristic may be determined with respect to such received RF communications.

It should be noted that the present disclosure is not limited to determining the locator configuration based on a single received signal characteristic with respect to communications transmitted from a fixed position device disposed on the object; multiple received signal characteristics, optionally obtained by different devices, may form the basis for determining the locator configuration. For instance, one fixed position device may determine a plurality of received signal characteristics with respect to wireless communications transmitted from another fixed position device, and the portable device may also determine a plurality of received signal characteristics with respect to the same wireless communications.

The received signal characteristic may be indicative of the type of environment in which the object is disposed. As a result, the system may determine a locator configuration based on the received signal characteristic, and therefore determine a locator configuration that corresponds to the type of environment (or an approximation thereof) in which the object is disposed.

The locator configuration determined based on the received signal characteristic may be a first locator that is trained or configured for operation with a first type of environment. Alternatively, the locator configuration may be a second locator that is trained or configured for operation with a second type of environment. In another alternative, the locator configuration may be the first locator in conjunction with a first adapter locator configured to affect output from the first locator to yield location information for a third environment different from the first environment for which the first locator is configured for operation. To provide an example, the first locator may be configured for operation in an open-air parking lot with no proximal vehicles, and the third environment may be an enclosed garage or an open-air parking lot with proximal vehicles.

In one embodiment, the adapter locator may be determined dynamically based on the received signal characteristic. This way, the system may adapt to operate in a variety of types of environments, including those that have not been previously encountered and for which the locator affected by the adapter locator has not been specifically trained or configured for operation.

I. System Overview

Figure 2:
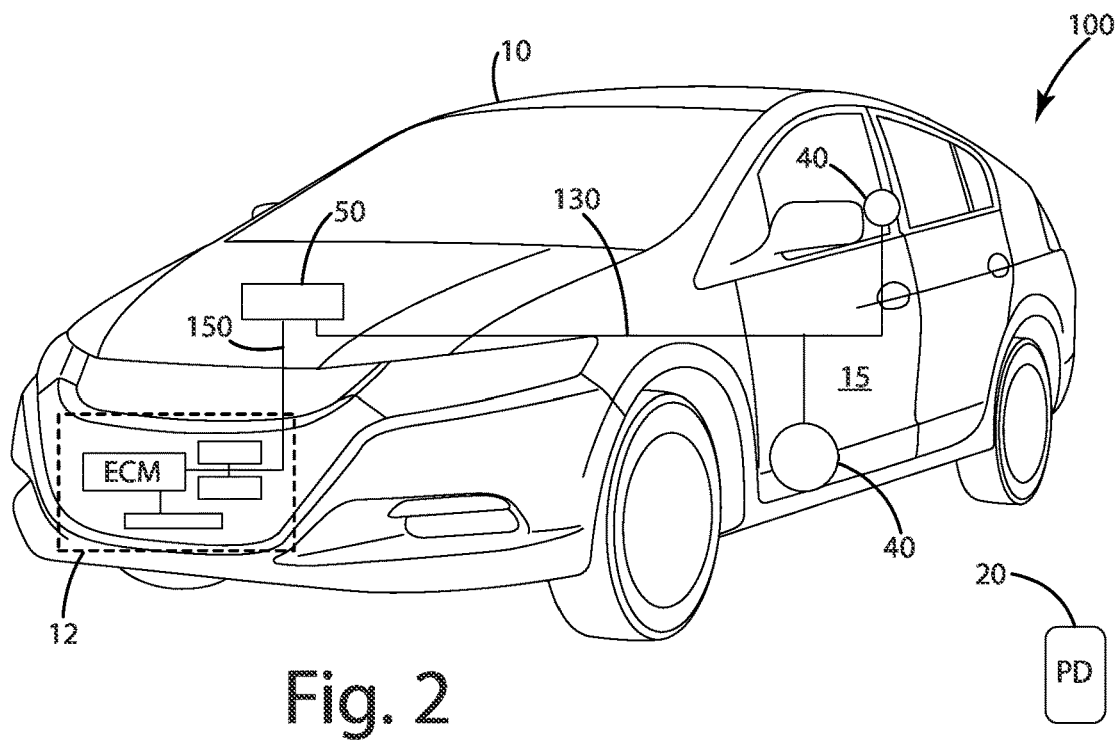
FIG. 2 depicts a representative view of the system in FIG. 1 disposed at least in part on an object.

A system in accordance with one embodiment is shown in the illustrated embodiment of FIGS. 1 and 2 and generally designated 100. The system 100 may include one or more system components as outlined herein. A system component may be a user 60 or an electronic system component, which may be the portable device 20, a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the portable device 20, the sensor 40, and the object device 50. The features described in connection with the object device 50 depicted in FIG. 3 may be incorporated into the portable device 20 or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus;

however, it is to be understood that the communication network is not so limited. The communication network may be any type of network, including a wired or wireless network, or a combination of two or more types of networks.

Figure 3:
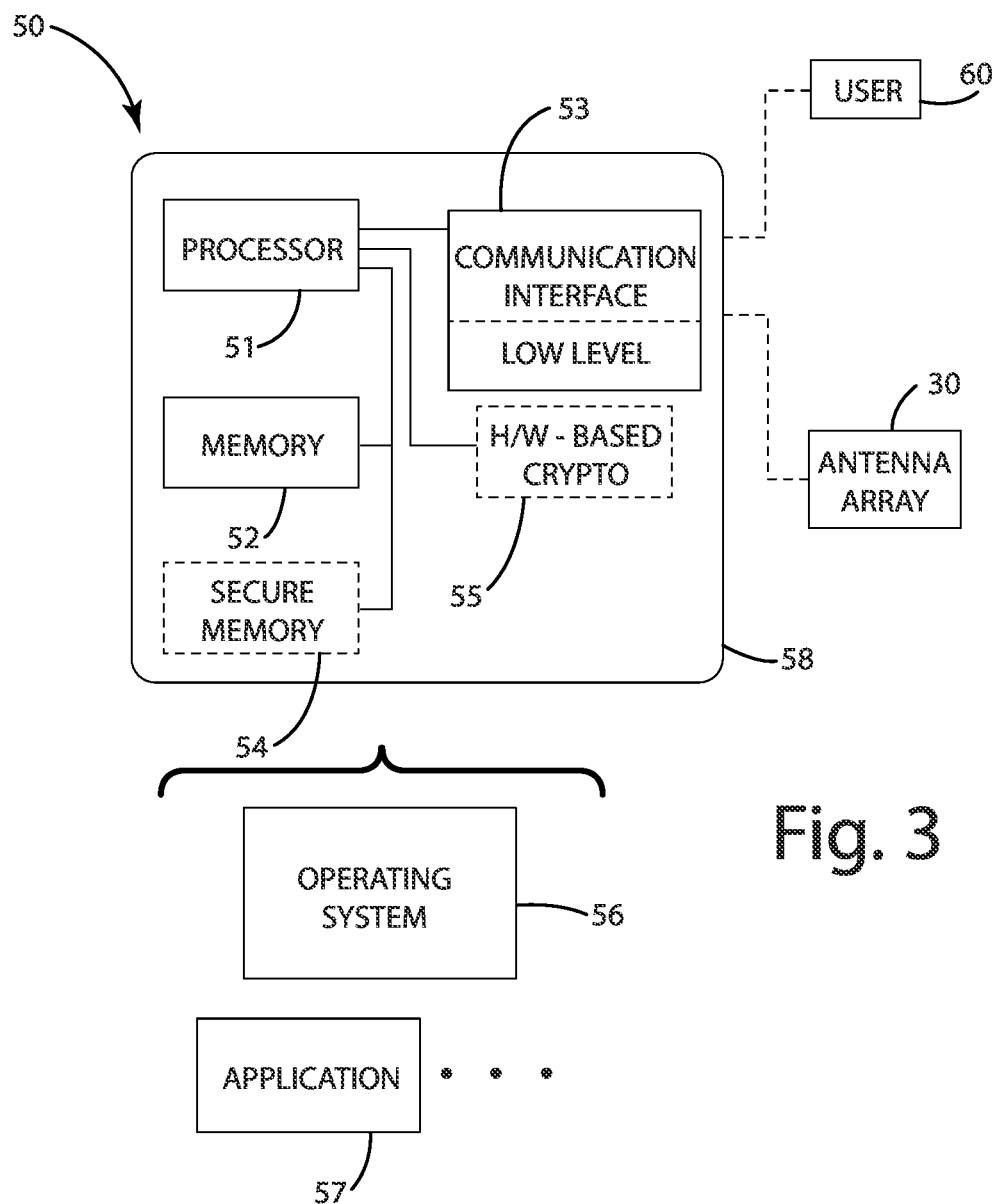
FIG. 3 shows a system component in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the portable device 20 or the sensor 40, or both, may similarly include a controller 58.

The controller 58 may include electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including Bluetooth Low Energy (BTLE) communications.

As another example, the communication interface 53 may provide a wireless communication link with another system component in the form of the portable device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

Figure 4:
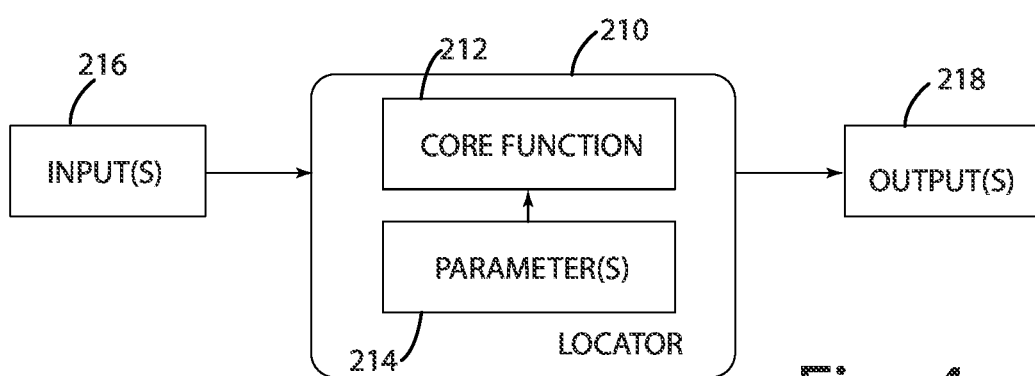
FIG. 4 shows a locator of the system in accordance with one embodiment.

In one embodiment, shown in FIG. 4, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the portable device 20. In the illustrated embodiment of FIGS. 1 and 2, the user 60 may carry the portable device 20 (e.g., a smartphone). The system 100 may facilitate locating the portable device 20 with respect to the object 10 (e.g., a vehicle) in real-time with sufficient precision to determine whether the user 60 is located at a position at which access to the object 10 or permission for an object command should be granted.

For instance, in an embodiment where the object 10 is a vehicle, the system 100 may facilitate determining whether the portable device 20 is outside the vehicle but in close proximity, such as within 5 feet, 3 feet, or 2 feet or less, to the driver-side door 15. This determination may form the basis for identifying whether the system 100 should unlock the vehicle. On the other hand, if the system 100 determines the portable device 20 is outside the vehicle and not in close proximity to the driver-side door (e.g., outside the range of 2 feet, 3 feet, or 5 feet), the system 100 may determine to lock the driver-side door. As another example, if the system 100 determines the portable device 20 is in close proximity to the driver-side seat but not in proximity to the passenger seat or the rear seat, the system 100 may determine to enable mobilization of the vehicle. Conversely, if the portable device 20 is determined to be outside close proximity to the driver-side seat, the system 100 may determine to immobilize or maintain immobilization of the vehicle.

The object 10 may include multiple object devices 50 or variant thereof, such as an object device 50 including a sensor 40 coupled to an antenna array 30, in accordance with one or more embodiments described herein.

Micro-location of the portable device 20 may be determined in a variety of ways, such as using information obtained from a global positioning system, one or more signal characteristics of communications from the portable device 20, and one or more sensors (e.g., a proximity sensor, a limit switch, or a visual sensor), or a combination thereof. An example of microlocation techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 1-3, the object device 50 (e.g., a system control module (SCM)) and a plurality of sensors 40 (coupled to an antenna array 30 as shown in FIG. 3) may be disposed on or in a fixed position relative to the object 10. Example use cases of the object 10 include the vehicle identified in the prior example, or a building for which access is controlled by the object device 50.

The portable device 20 may communicate wirelessly with the object device 50 via a communication link 140. The plurality of sensors 40 may be configured to sniff the communications of the communication link 140 between the portable device 20 and the object device 50 to determine one or more signal characteristics of the communications, such as signal strength, time of arrival, time of flight, or angle of arrival, or a combination thereof. The determined signal characteristics may be communicated or analyzed and then communicated to the object device 50 via a communication link 130 separate from the communication link between the portable devices 20 and the object device 50. Additionally, or alternatively, the portable device 20 may establish a direct communication link with one or more of the sensors 40, and the one or more signal characteristics may be determined based on this direct communication link.

Figure 15:
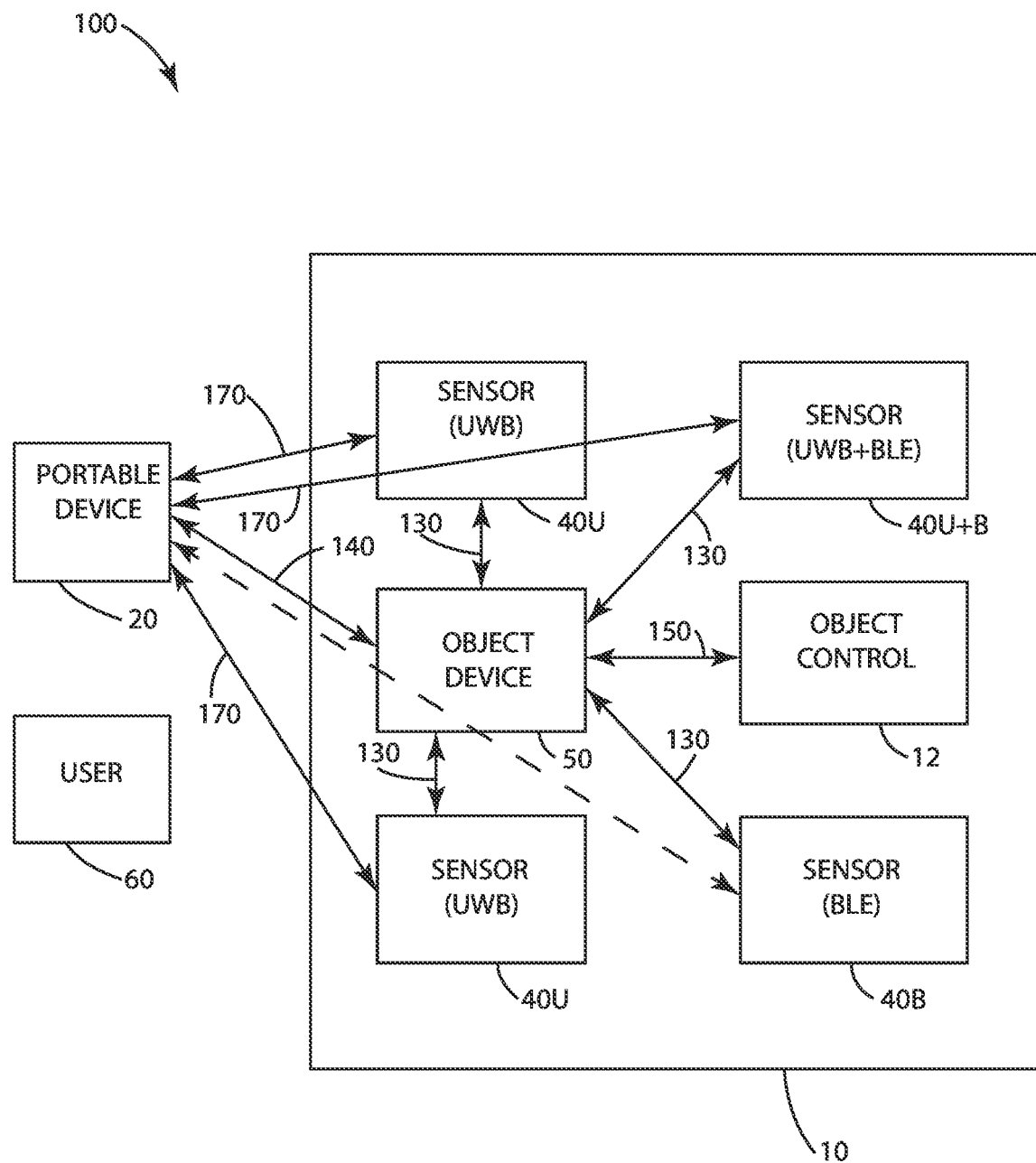
FIG. 15 shows a system in accordance with one embodiment of the present disclosure.

For instance, an alternative configuration of the system 100 is shown in the illustrated embodiment of FIG. 15. The system 100 may include a portable device 20, a user 60, and an object 10, similar to the system described in conjunction with FIG. 1. The object 10 in accordance with one embodiment may include an object device 50, an object control 12, and a plurality of sensors, which may be similar to the sensors 40 described herein.

In the illustrated embodiment, the portable device 20 may include both Ultra Wide Band (UWB) and BTLE communication capabilities. For instance, the portable device 20 may be a portable device in the form of a smartphone with both UWB and BLE radios.

The system 100 in the illustrated embodiment of FIG. 15 may include one or more sensors 40 (which may also be described as anchors) that are disposed on the object 10. The one or more sensors 40 may be disposed in a variety of positions on the object 10, such as the positions described herein, including for instance, one or more sensors 40 in the door panel and one or more other sensors in the B pillar, as shown and described in connection with FIG. 2.

One or more of the sensors 40 may be operable to communicate via at least one communication link according to a communication protocol. The communication link may be established via one or more channels. As described in connection with FIGS. 1-2, the sensor 40 may be operable to communicate by sniffing or receiving communications via at least one communication link 140 established between the object device 50 and the portable device 20, such that the sensor 40 does not transmit communications via the communication link 140. This type of communication for the sensor 40 is shown in phantom lines in FIG. 15.

However, one or more sensors 40 in the system 100 of FIG. 15 may be operable to communicate by transmitting and receiving communications via at least one communication link 170 established directly with the portable device 20. In this way, the sensor 40 may directly communicate with the portable device 20. The at least one communication link 170 may include communications according to more than one protocol (e.g., BTLE and UWB).

The one or more sensors 40 of the system 100 in the illustrated embodiment of FIG. 15 may be operable to a) sniff communications with respect to the communication link 140 between the portable device 20 and the object device 50, or b) directly communicate with the portable device 20 via the at least one communication link 170. The communication capabilities of the one or more sensors 40 in the illustrated embodiment is identified in the figure and by a letter designation U for UWB and B or BTLE. For example, the sensor 40U is an ultra-wideband anchor responsive to UWB signals; sensor 40U+B is responsive to both UWB and BTLE communications; and sensor 40B is a BTLE anchor.

It is to be understood that an object 10, such as a vehicle, may include more sensors 40 than shown in the illustrated embodiment of FIG. 15. Depending on the implementation, some number of anchors may be integrated in a vehicle. For instance, 3 to 10 anchors with both UWB and BTLE capabilities may be provided.

In one embodiment, UWB, similar to BTLE, is a standardized communication protocol (see IEEE 802.15.4a/z). One way in which UWB may differ from BTLE is with respect to ranging applications. UWB may involve transmitting short duration pulses that allow for time-of-flight functions to be used to determine the range from the portable device 20 to one or more sensors 40U, 40U+B (e.g., anchors). Then the object device 50 may use a lateration function and/or multilateration function to determine localization with respect to the portable device 20 (e.g., the location of the portable device 20 relative to the object 10). Lateration and/or multilateration may involve processing a set of ranges from the portable device 20 to each sensor 40 to output a position estimate of the portable device 10 relative to the object 10). The portable device 20 and the UWB-enabled sensors 40U, 40UB may transmit and receive packets of data back-and-forth, enabling a time-of-flight determination with respect to such communications.

The system 100 in the illustrated embodiment of FIG. 15 may include at least two different communication links for determining localization. For instance, the communication link 140 may utilize BTLE-based localization, and the communication link 170 may utilize UWB-based localization. In the illustrated embodiment, the communication link 170 is designated with respect to each of the sensors 40U, 40U+B; however, it is to be understood that each of these communication links 170 may not be the same. For instance, each of the communication links 170 may be separate (e.g., a separate channel or band).

Utilizing multiple communication links for localization may provide a number of benefits.

For instance, in a configuration in which both BTLE and UWB information are obtained, this information can be combined to enhance and stabilize a localization estimate. The BTLE and UWB channels used in the localization may involve different frequencies, and the signal characteristics to be exploited for ranging are different (RSSI for BTLE and time-of-flight for UWB).

RSSI ranging calibration may be augmented or supplemented with time-of-flight from UWB communications. This augmentation or supplemental use of time-of-flight may be conducted in real-time by the system 100, or conducted in a manner to adapt a model that uses sensed information not based on UWB communications (e.g., only sensed information with respect to BTLE communications).

For instance, one embodiment according to the present disclosure may be directed toward calibrating out variance of RSSI or range calculations. BTLE+UWB capable portable devices 20 may be tested to build up a map of BTLE communication characteristics, UWB communication characteristics, and ranging or localization data. A BTLE-only portable device 20 may be operable to process such maps but without UWB communications characteristics to refine RSSI-only range estimates. For instance, the locator 210 may be based on both BTLE+UWB communication characteristics; however, in practice, the locator 210 may generate location information based on BTLE communication characteristics without the UWB communication characteristics. Alternatively, the locator 210 may be based on BTLE communication characteristics, and may be operable in practice to generate location information based on both UWB and BTLE communication characteristics. It is to be understood that BTLE or UWB, or both, may be replaced with another type of communication protocol.

The portable device 20, in one embodiment, can establish a direct communication link 170 with one or more of the sensors 40U, 40U+B, and the one or more signal characteristics (e.g., time-of-flight) may be determined based on this direct communication link 170.

As described herein, one or more signal characteristics, such as signal strength, time of arrival, time of flight, and angle of arrival, may be analyzed to determine location information about the portable device 20 relative to the object 10, an aspect of the object 10, or the object device 50, or a combination thereof. For instance, time difference of arrival or the angle of arrival, or both, among the sensors 40 and the object device 50 may be processed to determine a relative position of the portable device 20. The positions of the one or more antenna arrays 30 relative to the object device 50 may be known so that the relative position of the portable device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, etc., or any combination thereof.

II. Locator

The system 100 in the illustrated embodiment of FIGS. 1-3 may be configured to determine location information about the portable device 20 relative to the object 10. The location information may be indicative of an exterior location of the portable device 20 relative to the object 10, or the location information may be indicative of an interior location of the portable device 20 within the object 10, or both. In one embodiment, a locator may be configured to determine this location information. A locator in accordance with one embodiment is depicted in FIG. 4 and generally designated 210. The locator 210 may be configured to receive one or more inputs 216, such as one or more signal characteristics of wireless communications transmitted by the portable device 20 and received by one or more sensors 40. The inputs may be translated to one or more outputs 218 corresponding to the location information.

It should be understood that the inputs 216 are not limited to signal characteristics of wireless communications. The inputs 216 may include one or more measurements of characteristics or parameters other than wireless communications, such as an object state (e.g., a door is open) or a previous location or zone determination, or any combination thereof. Additionally, or alternatively, the inputs 216 may be indicative of a state of the object 10 or another device in the system 100. For instance, in the context of a vehicle, the one or more of the inputs 216 may indicate that one or more of the vehicle doors are open or closed, or whether a window is open or closed.

The locator 210 in the illustrated embodiment may be incorporated into the object device 50. For instance, the controller 58 of the object device 50 may incorporate the locator 210, and be communicatively coupled to one or more of the sensors 40 via the communication interface 53.

The locator 210 may include a core function or locator algorithm 212 that is configured to receive the one or more inputs 216 and to generate the one or more outputs 218 indicative of a location of the portable device 20 relative to the object 10. As discussed herein, the one or more inputs 216 may vary from application to application. Examples of inputs 216 include one or more signal characteristics of the communications, such as signal strength (RSSI), angle of arrival (AOA), and time of flight (TOF).

Figure 5:
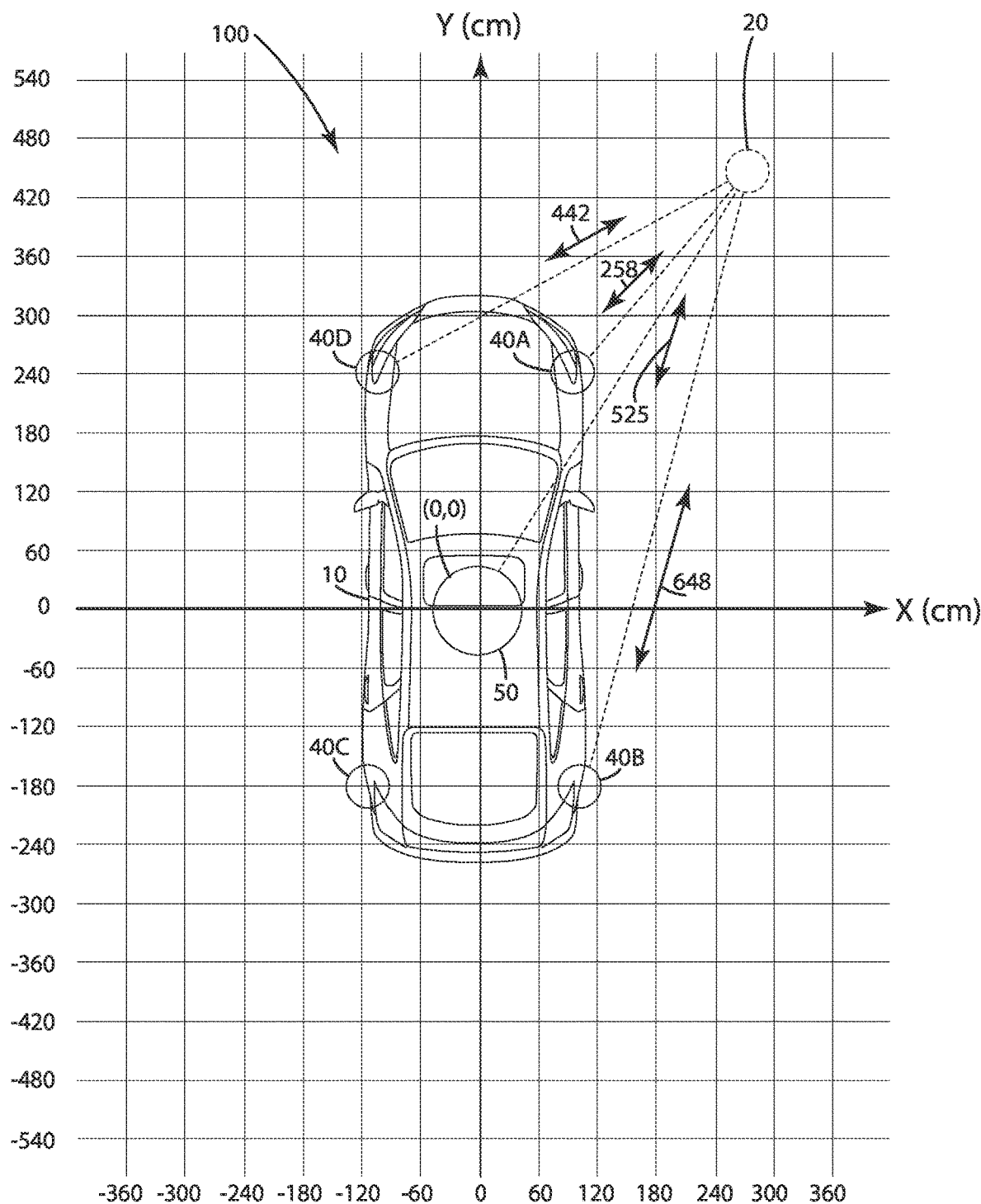
FIG. 5 depicts values for locating a portable device in accordance with one embodiment.

In the illustrated embodiment of FIG. 5, the system 100 is provided in conjunction with an object 10 that is a vehicle. The object 10 may be different in other applications. The system 100 in the illustrated embodiment includes an object device 50 and a plurality of sensors 40A-D disposed in a fixed position on the object 10, such that these devices comprise fixed position devices. The locations of the sensors 40A-D and the object device 50 may vary from application to application; however, for purposes of disclosure the object device 50 is disposed generally in a center of the vehicle and the sensors 40A-D are disposed at the four corners of the vehicle. A grid is shown in the illustrated embodiment to facilitate discussion in conjunction with the locator 210.

In the illustrated embodiment of FIG. 5, the portable device 20 is disposed at X, Y coordinates 270 cm, 450 cm relative to the origin (0 cm, 0 cm) provided near the center of a vehicle cabin of the object 10. The origin is provided at this position for purposes of disclosure; however, it is to be understood that the origin may be provided anywhere with respect to the object 10, including the center of the object 10. The sensors 40A, 40B, 40D are respectively positioned at 258 cm, 648 cm, and 442 cm relative to the portable device 20. In one embodiment, a signal characteristic of communications (e.g., RSSI) transmitted from the portable device 20 and received by each of the sensors 40A, 40B, 40D and the object device 50 may be translated by the locator 210 to a distance relative to each respective sensor 40A, 40B, 40D. (Sensor 40C is shown and left out of this determination in the illustrated embodiment because a portion of the vehicle obstructs the line of sight between the portable device 20 and the sensor 40C, potentially preventing a valid measurement of a signal characteristic of communications.)

The locator 210 in one embodiment may translate the signal characteristic obtained from a sensor 40 or the object device 50 to a distance metric or other parameter in a variety of ways, including, for instance, a translation table for each fixed position device or type of fixed position devices, fingerprinting or other heuristic (e.g., a machine learned translator). An example of a translation table is shown in chart form in the illustrated embodiment of FIG. 6 and generally designated 600. The translation table depicts three translation tables for different environments, as discussed herein. For purposes of this example, the locator 210 will be described in conjunction with being configured for translating RSSI to distance in an outdoor environment, based on the outdoor translation table 610, in which no vehicles are in proximity to the vehicle.

Figure 6:
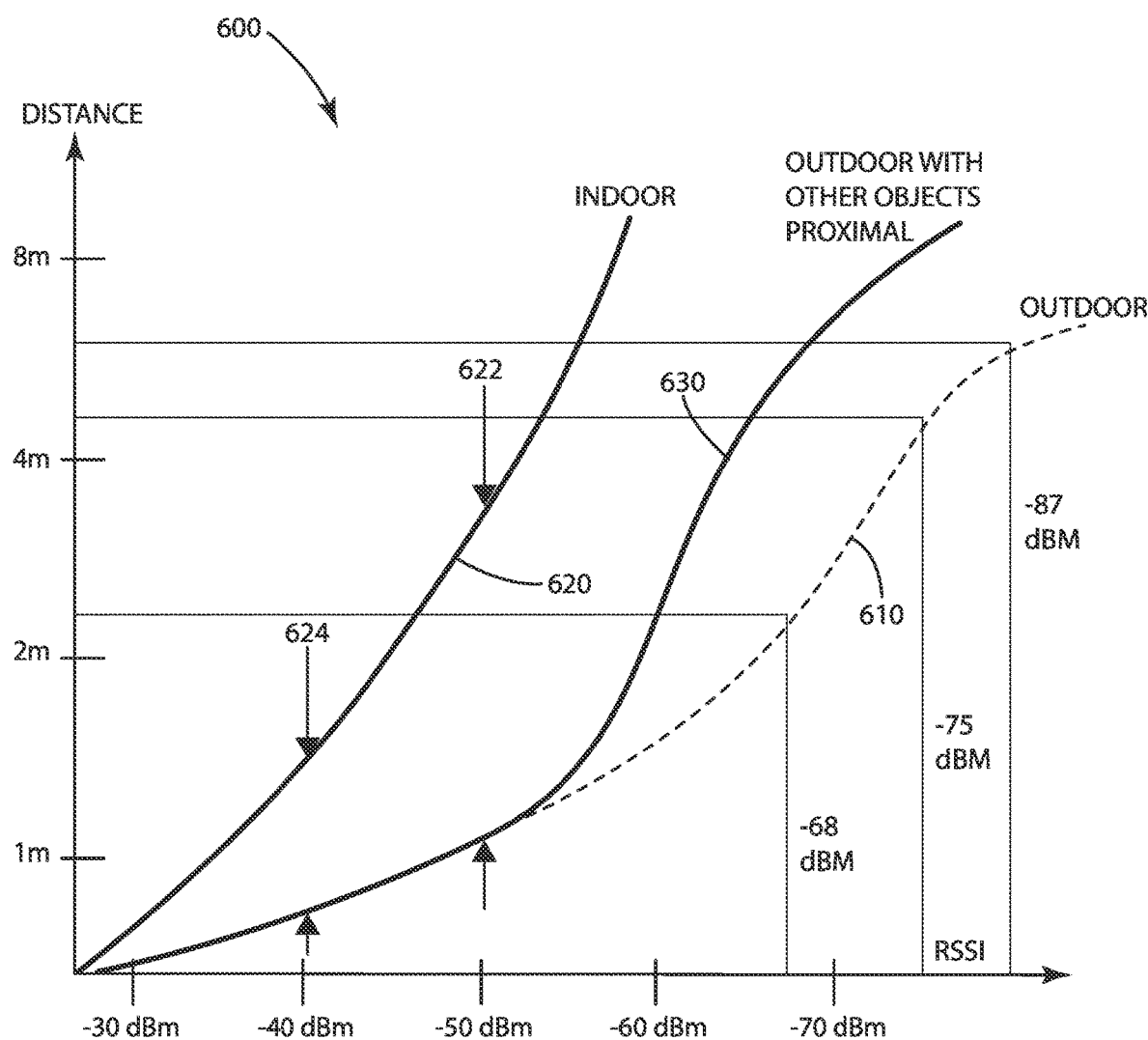
FIG. 6 shows multiple relationships between a signal characteristic and a metric, such as distance, in accordance with one embodiment.

In the illustrated embodiment of FIG. 6, the outdoor translation table 610 is operable to translate RSSI to a distance for each of the sensors 40A, 40B, 40D. Returning to the illustrated embodiment of FIG. 5, measurements of RSSI for the sensors 40A, 40B, 40D correspond generally and respectively to −68 dBm, −87 dBm, and −75 dBm. These RSSI measurements for each sensor 40A, 40B, 40D may be translated directly to distance measurements based on the outdoor translation table 610; alternatively, the locator 210 may utilize the RSSI measurement to represent distance in further calculations to determine the position of the portable device 20 relative to the object 10.

In the illustrated embodiment, with the three distances determined relative to each of the sensors 40A, 40B, 40D based on the outdoor translation table 610, the locator 210 may determine a location of the portable device by trilateration of the three distances given known positions of the sensors 40A, 40B, 40D. It should be noted that the present disclosure is not limited to trilateration as part of the locator algorithm 212; a variety of additional or alternative functions may form part of the locator algorithm 212, as discussed herein, including a distance function, a triangulation function, a lateration, a multilateration function, a fingerprinting function, a differential function, a time of flight function, a time of arrival function, a time difference of arrival function, an angle of departure function, a geometric function, etc., or any combination thereof.

A. Environmental Variations

As discussed herein, the relationship between a signal characteristic of wireless communications received from the portable device 20 and distance or location may vary depending on the type of environment in which the object 10 is located. For instance, in the illustrated embodiment of FIG. 6, the relationship between RSSI and distance is different for each of the three types of environments: 1) outdoors (outdoor translation table 610); 2) outdoors with other objects in proximity to the object 10 (outdoor with other objects translation table 630); and 3) indoors (indoor translation table 620). As other objects or obstructions are presented nearer to the object 10, reflections from those other objects or obstructions can change the relationship between the signal characteristic of wireless communications received from the portable device 20 and distance or location. This change in relationship can be seen in the differences between the outdoor translation table 610 and the indoor translation table 620.

Figure 7:
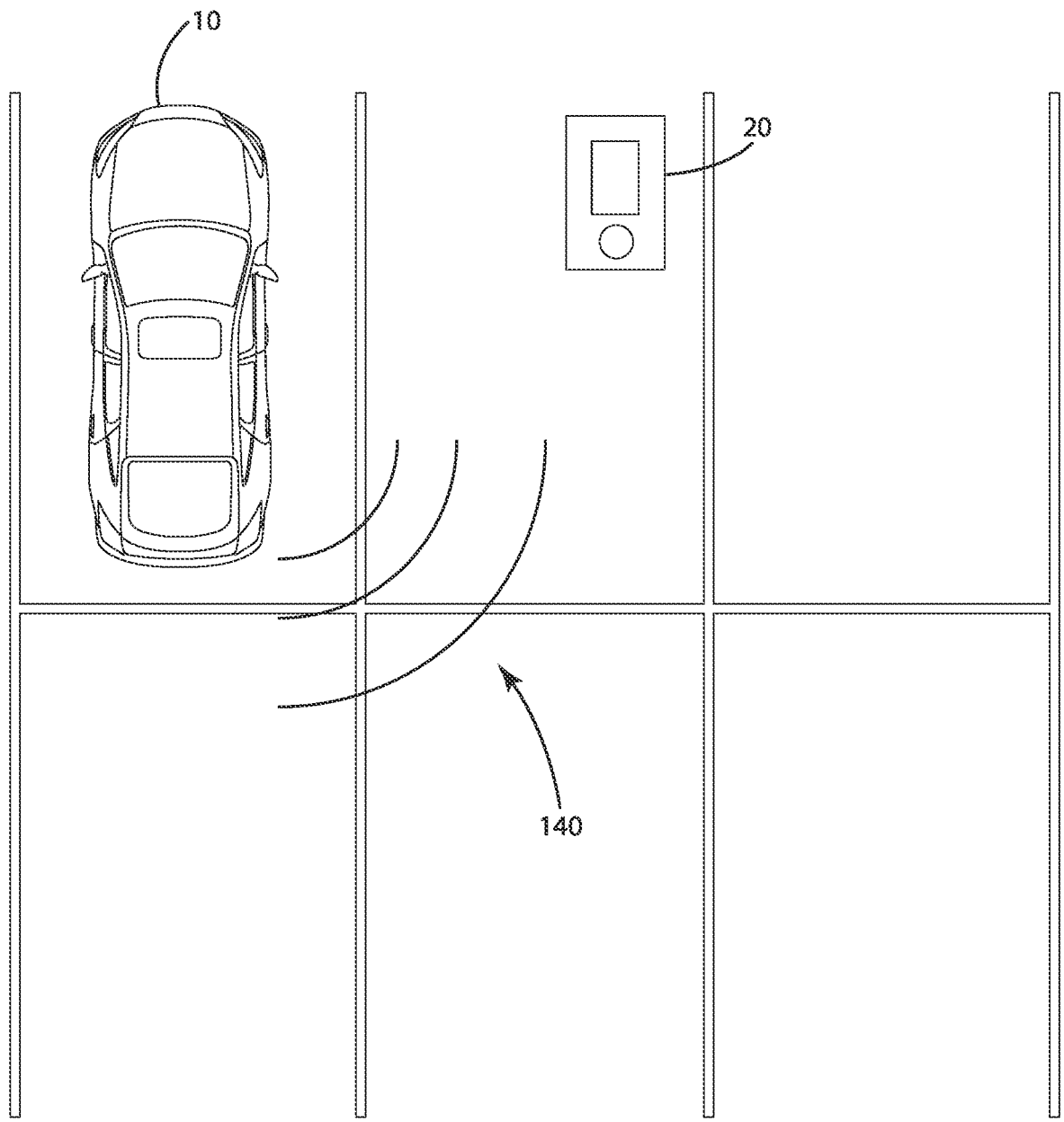
FIG. 7 shows an object disposed in an area without other objects being nearby.
Figure 9:
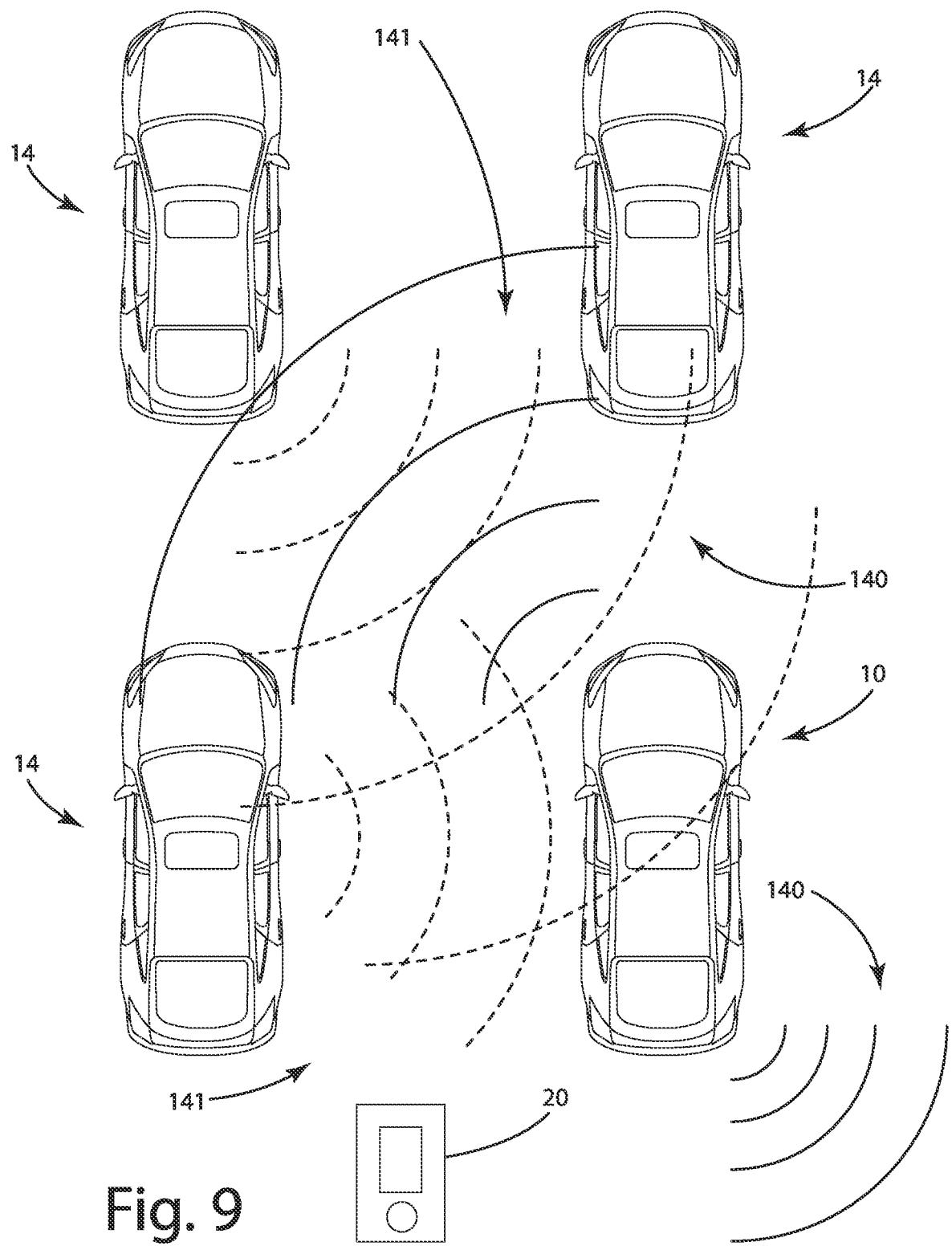
FIG. 9 shows an object disposed in an area with other objects being nearby.

More specifically, in the illustrated embodiment of FIGS. 7 and 9 contrasting environments are shown in which the object 10 is disposed. The object 10 in the illustrated embodiment of FIG. 7 is disposed in an outdoor setting (e.g., an open-air parking lot) with no other objects (e.g., other vehicles) in proximity to the object 10. As shown in FIG. 7, RF communications 140 emanating from the object 10 propagate substantially without reflecting off nearby objects in proximity to the object 10 and the portable device 20. The object 10 is shown in FIG. 9 with other objects 14 in proximity to the object 10 and the portable device 20. These other objects 14 reflect the RF communications 140 emanating from the object 10 such that the reflections 141 affect a measured value of the signal characteristic of wireless communications different than if the other objects 14 were absent as depicted in FIG. 7. The other objects 14 present in the illustrated embodiment of FIG. 9 and resulting reflections 141 may yield a functional relationship between RSSI and distance according to the outdoor with other objects translation table 630, whereas this functional relationship between RSSI and distance without presence of these other objects 14 as shown in FIG. 7 may be according to the outdoor translation table 610.

Figure 8A:
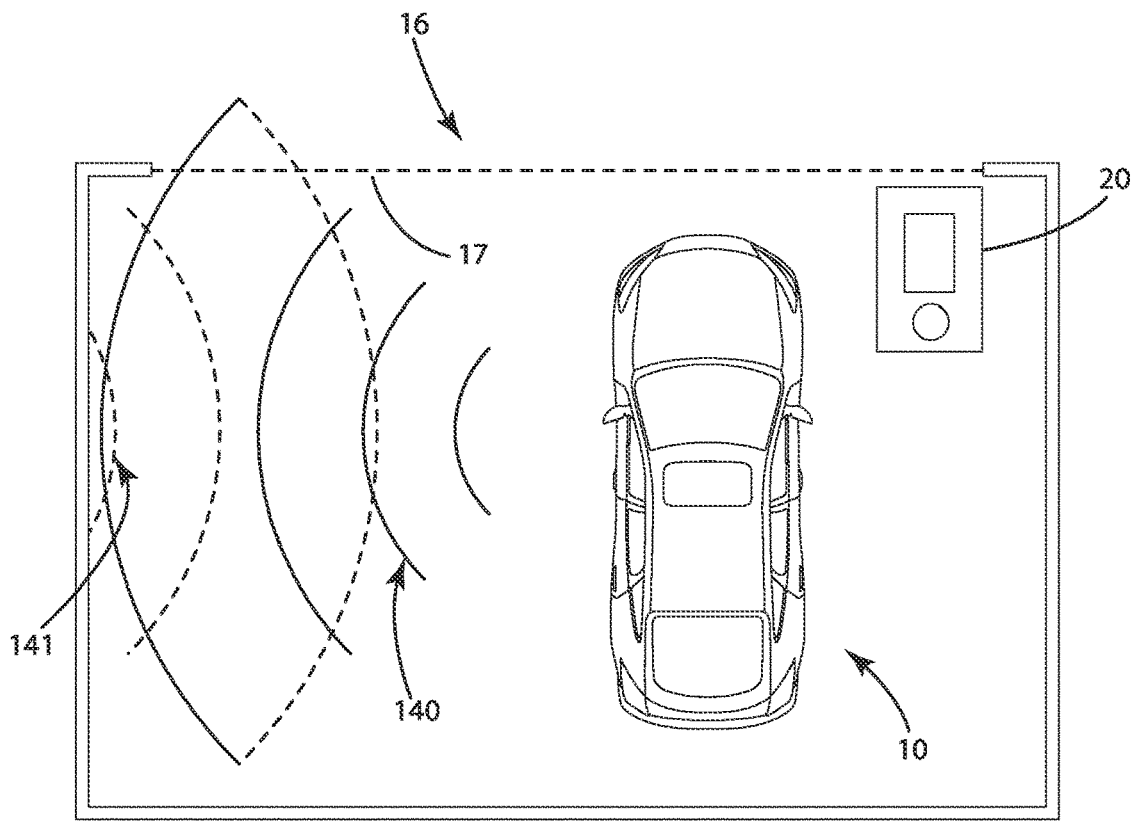
FIG. 8A shows an object disposed in a garage with a garage door in an open position.
Figure 8B:
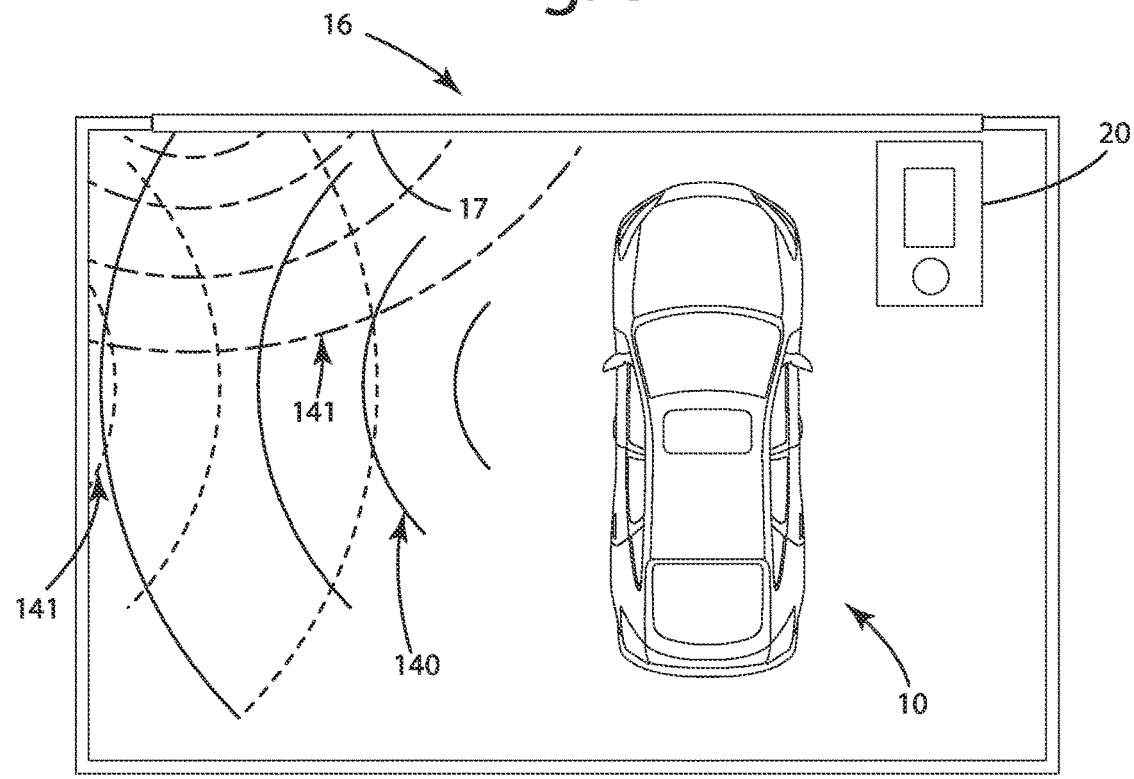
FIG. 8B is similar to FIG. 8A but the garage door is in a closed position.

It is noted that in the illustrated embodiments of FIGS. 7-9 in which various embodiments and environments are depicted, the RF communications 140 are shown emanating from the object 10. It is noted that RF communications 140 may emanate from the portable device 20 or a sensor 40, or both, and that these RF communications 140 may be reflected from other objects 14 present in proximity to the object 10. Proximity for another object 14 as used herein means sufficient proximity to cause reflections 141 that appreciably affect a functional relationship between distance or location and the signal characteristic of communications measured by a fixed position device (e.g., the object device 50 or the sensor 40, or both).

As discussed herein, one or more received signal characteristics of the RF communications 140 transmitted from the object 10 may form the basis for a determination of the type of environment, thereby facilitating selecting the type of functional relationship to utilize in the locator 210 for the one or more signal characteristics of RF communications transmitted by the portable device 20 and a determination of location information based on the one or more signal characteristics of RF communications transmitted by the portable device 20.

The environment in which the object 10 is disposed may vary dynamically. Other objects 14 may become present or absent in proximity to the object 10, and may yield the reflections 141. In the illustrated embodiments of FIGS. 8A-B, the object 10 is disposed in an indoor garage 16 with a movable barrier 17 that allows entry and exit via an entrance to the interior space of the indoor garage 16 as well as blocking the entrance to prevent access to the interior space. In the illustrated embodiment of FIG. 8A, the movable barrier 17 is in the open position so that reflections 141 of the RF communications 140 are produced from the interior walls of the indoor garage 16 but not from the movable barrier 17 near the entrance. The movable barrier 17 is in the closed position in the illustrated embodiment of FIG. 8B, and is shown yielding such reflections 141 near the entrance of the indoor garage 16. Differences in the environment such as these can affect the locator 212 differently.

One embodiment in accordance with the present disclosure may determine the type of environment or one or more environmental characteristics based on one or more received signal characteristics of communications transmitted from a fixed position device disposed on the object 10, such as the object device 50 or the sensor 40, or both. The one or more received signal characteristics may be determined based on communications received by at least one other fixed position device disposed on the object 10 or the portable device 20, or a combination thereof. Based on the type of environment, or the one or more environmental characteristics, or a combination thereof, the system 100 may select a locator algorithm 212 or adapt the locator 212 to affect the output therefrom.

It is noted that environmental variations may cause differences in the relationship between the signal characteristic and distance, such as the relationships shown in the illustrated embodiment of FIG. 6. The relationship for one environment may be functionally correlated to the relationship for another environment. In some cases, the relationship for one environment may not be readily mapped to the relationship for another environment. There may not be a functional correlation between the relationship for one environment and the relationship for another environment. Example functional correlations between the relationships for two different environments include a proportional offset (e.g., slope), which is a subset of a difference defined as a function of the value of the signal characteristic (e.g., slope*value+initial offset). Other example functional correlations, resulting from changes in the environment, may be more complex. As an example, instead of determining a particular environment, the system may dynamically offset or may adjust one or more parameters of a locator based on feedback from one or more sensed parameters, thereby yielding at least two different locators or locator configurations. Parameters of the locator may be varied, or preprocessing of signals input to the locator may be varied, or a combination thereof, to account for the environmental variations.

In one embodiment, the functional correlation for the relationship between the signal characteristic and distance for two environments may be used by an adapter locator 310 to adapt a locator 212 configured for one environment to generate output pertaining to the other environment. As discussed herein the adapter locator 310, including the functional correlation, may be selected based on a determination of the type of environment in which the object 10 is disposed. For instance, the adapter locator 310 may vary one or more parameters 214 of the locator algorithm 212 of the locator 210 based on the determined type of environment, resulting in an adapter locator 310 configured for the determined type of environment rather than the environment for which the locator 210 is specifically configured. Additionally or alternatively, an environment specific locator 210 may be selected based on the determination of the type of environment in which the object 10 is located.

A method in accordance with one embodiment may dynamically determine an adapter locator 310, such that one or more parameters for the adapter locator 310 may be determined by the system 100 based on one or more signal characteristics obtained in the environment. The system 100 may be configured to transmit wireless communications from a fixed position device (e.g., a sensor 40 or an object device 50, or both) disposed on the object 10. These wireless communications may be received by another fixed position device or the portable device 20, or both, to produce one or more received signal characteristics pertaining to the wireless communications. Based on these one or more received signal characteristics, the system 100 may determine a type of environment in which the object is disposed 10, or one or more characteristics of the environment, or both. And, based on the type of environment, or the one or more characteristics of the environment, or both, the system 100 may select a predefined locator 210, select a predefined adapter locator 310 for a locator 210, or determine one or more parameters for an adapter locator 310 to adapt a locator 210 for the environment.

B. Locator Algorithm

The locator algorithm 212 of the reference locator 210 may be tunable according to a plurality of parameters 214 of the reference locator 210. Example parameters include the following: sensor offsets (e.g., RSSI or AOA offsets, or both), zone offsets (e.g., thresholds and hysteresis parameters), and distance conversion (e.g., constants or equations, or both). Based on the one or more inputs 216 and the values of the plurality of parameters 214, the locator function 212 may provide an output 218 indicative of a location of the reference device 200 relative to the object 10. The locator algorithm 212 may vary from application to application.

Figure 14:
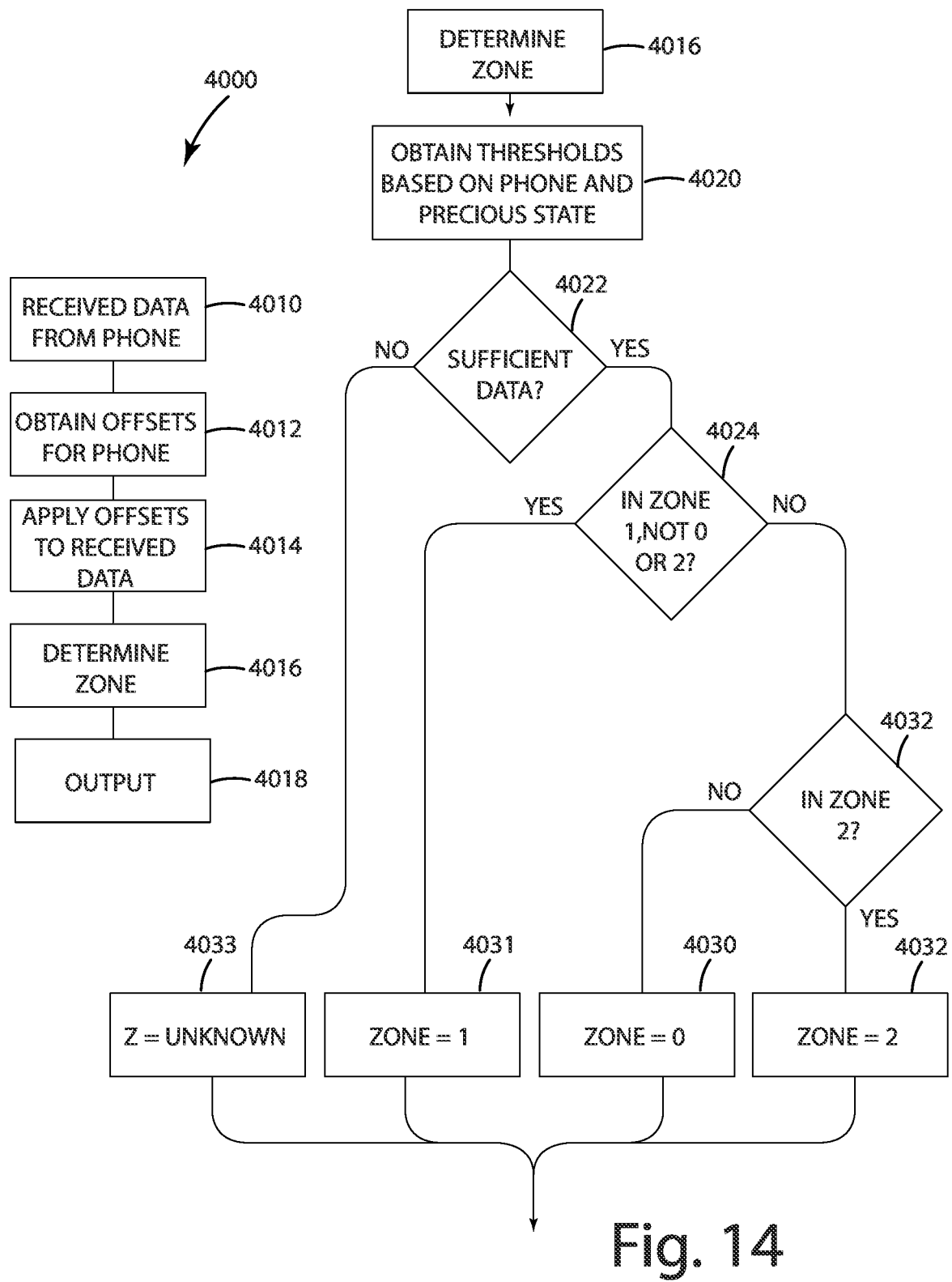
FIG. 14 shows a method of determining location of a device in accordance with one embodiment.

A method of determining location in accordance with one embodiment of the locator algorithm 212 is depicted in FIG. 14 and generally designated 4000. The method of FIG. 14 may include receiving data from the device or inputs 216, obtaining offsets for the device (e.g., reference locator and/or adaptor locator offsets), applying the offsets to the received data, and determining the zone as an output 218. Steps 4010, 4012, 4014, 4016, 4018. The zone determination may include obtaining one or more thresholds based on the type of device and a previous state, which, as an example, may be previous zone determination. Step 4020. The method may include determining if there is sufficient data, and if not generating an output indicative of the zone being unknown. Step 4022, 4033. If there is sufficient data, the locator may determine, based on the data, the thresholds, the offsets, variability indicators, hysteresis settings, or another parameter or measurement, or any combination thereof, if the device is located in zone 1 (e.g., inside) and not zone 0 (e.g., far away) or 2 (e.g., near). Step 4024, Step 4031. An alternative set of zones may be driver side (0), inside (1) or passenger side (2)—although it should be understood the present disclosure is not so limited. Based on a similar determination to Step 4024, the locator may determine if the device is in zone 2, and if so, provide an output accordingly. Steps 4026, 4032. If the device is determined not to be in zone 2, the locator may output that the device is in zone 0. Step 4026, 4030.

In another example, locator algorithm 212 may be a neural network (e.g., a convolutional neural network with one or more layers), and the one or more parameters may include weights of nodes within the neural network. The weights may be adjusted during training of the locator 210 with samples obtained for a portable device 20 and the object 10 and truth information obtained with respect to the samples.

In a vehicle, there may be many antennas in accordance with one embodiment of the system 100, where each of the antennas may be in a different location with a different orientation. All or a subset of the antennas and associated devices, such as the object device 50 or the sensor 40, may obtain RSSI measurements simultaneously.

Because a variety of factors can affect one or more signal characteristics of communications between the receiver and transmitter, to facilitate tuning the locator 210 and the locator algorithm 212, samples may be obtained for the one or more signal characteristics under a variety of conditions.

Example variations in conditions can include purposefully rotating the portable device 20 in all directions, as well as obtaining test samples at different heights to ground, to force testing or obtaining samples to cover a large percentage of all possible angles/orientations.

III. Environment Determination

Figure 12:
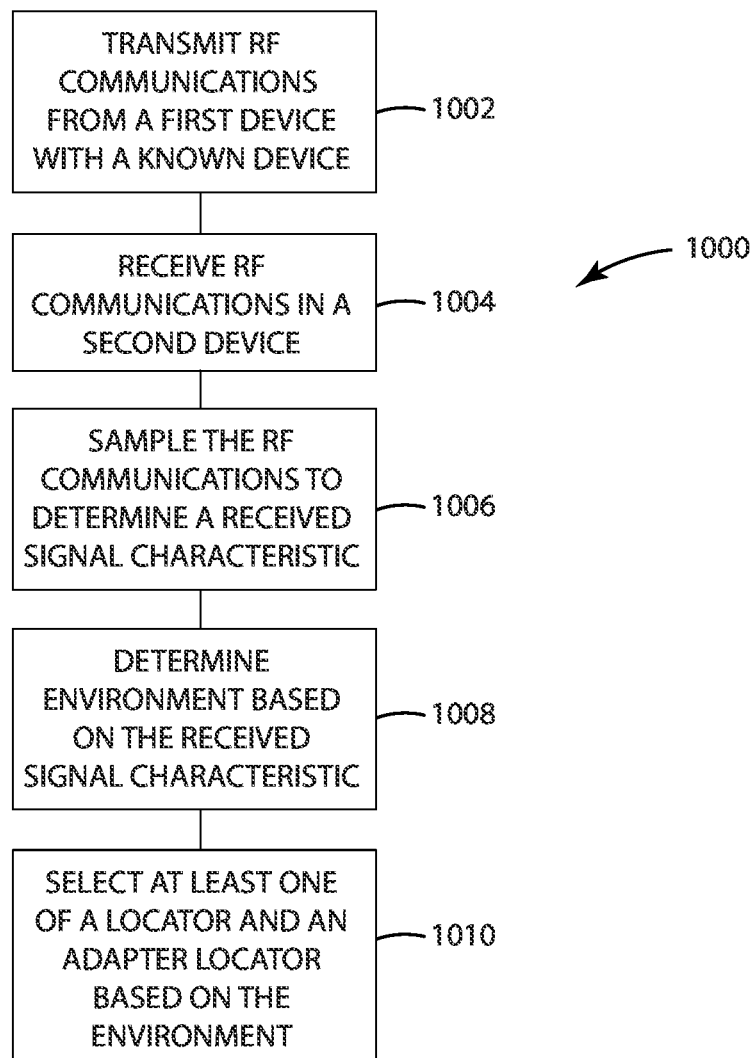
FIG. 12 shows a method of selecting a locator in accordance with one embodiment.

A method in accordance with one embodiment of the present disclosure for determining a type of environment, or characteristic thereof, or both, in which the object 10 is disposed is shown in FIG. 12 and generally designated 1000. The method 1000 involves obtaining a plurality of samples with respect to RF communications transmitted from a fixed position device (e.g., an object device 50 or a sensor 40) disposed at a known position on the object 10. It should be noted that the fixed position device may not be disposed on the object 10 in an alternative embodiment; rather the position of the fixed position device in this alternative embodiment may be known relative to the object 10 but not disposed on the object 10.

The RF communications transmitted from a first fixed position device may be received by a second device, such as a second fixed position device or the portable device 20, or both. Steps 1002, 1004. The first fixed position device may be any type of device described herein, including a sensor 40 or an object device 50, or the portable device 20. These RF communications received by the second device may be sampled and analyzed to yield one or more received signal characteristics with respect to the RF communications transmitted from the fixed position device. Step 1006. For purposes of disclosure, the RF communications transmitted from the first fixed position device are described in conjunction with being received by the second device, but the present disclosure is not so limited—multiple devices may receive the RF communications and determine the one or more received signal characteristics with respect to the received RF communications. In one embodiment, the RF communications transmitted from the fixed position device are received by the portable device 20, and as discussed herein, the portable device 20 may communicate sensed information pertaining to the RF communications received from the fixed position device. One or more sensors 40 may also receive the RF communications from the fixed position device and communicate sensed information to the fixed position device that pertains to the received RF communications. The fixed position device (e.g., the first fixed position device) may include an environmental determiner to determine a type of environment (and/or a characteristic of the environment) in which the fixed position device and/or the object 10 is disposed. The fixed position device may communicate the output of such a determination to another device, such as the object device 50 or the portable device 20.

Additionally, or alternatively, the fixed position device may be a sensor and the second device may be another sensor. The second device may receive the RF communications and transmit sensed information pertaining to the RF communications to the object device 50 (e.g., a hub).

The one or more received signal characteristics may be analyzed, such as by an environment determiner, to determine the type of environment in which the object 10 is disposed or a characteristic of the environment, or a combination thereof. Step 1006. For instance, the one or more received signal characteristics may be indicative of the object 10 being in an enclosed garage with a movable barrier in the closed position. As another example, the one or more received signal characteristics may be indicative of the object 10 being in an open-air parking lot with no other similar objects in proximity thereto.

The one or more received signal characteristics may be similar to one or more of the signal characteristics provided as inputs to the locator 210 for determining location information about the portable device 20 relative to the object 10. For instance, the one or more received signal characteristics may include RSSI, AOA, and TOF.

The algorithm for determining the type of environment or the characteristic of the environment may vary from application to application. In the illustrated embodiment, the algorithm may include determining environment based on one or more parameters being indicative of a particular environment. In an alternative embodiment, the environment or a characteristic thereof may be identified based on similarity of the received signal characteristic to truth data for the same signal characteristic and a similar or the same environment (or characteristic thereof). In the illustrated embodiment of FIG. 10, such truth data in accordance with one embodiment is shown in conjunction with RSSI and RF communications transmitted according to a set of RF communication parameters. The RF communication parameters are constant in the illustrated embodiment, but one or more of these parameters may be varied. As shown, the RSSI (the received signal characteristic) varies depending on the type of environment in which the object 10 is disposed. For instance, as discussed herein, reflections 141 caused by objects in proximity to the object 10 may affect RF communications in proximity to the object 10. The reflections 141 may occur with respect to the RF communications transmitted from the fixed position device disposed on the object 10, as well as with respect to RF communications transmitted from the portable device 20. For at least this reason, measuring the effect of an environment on RF communications transmitted from the object 10 can form the basis for accounting for these effects on RF communications transmitted from the portable device 20 (e.g., by selecting a locator 210 and/or an adapter locater 310).

Figure 10:
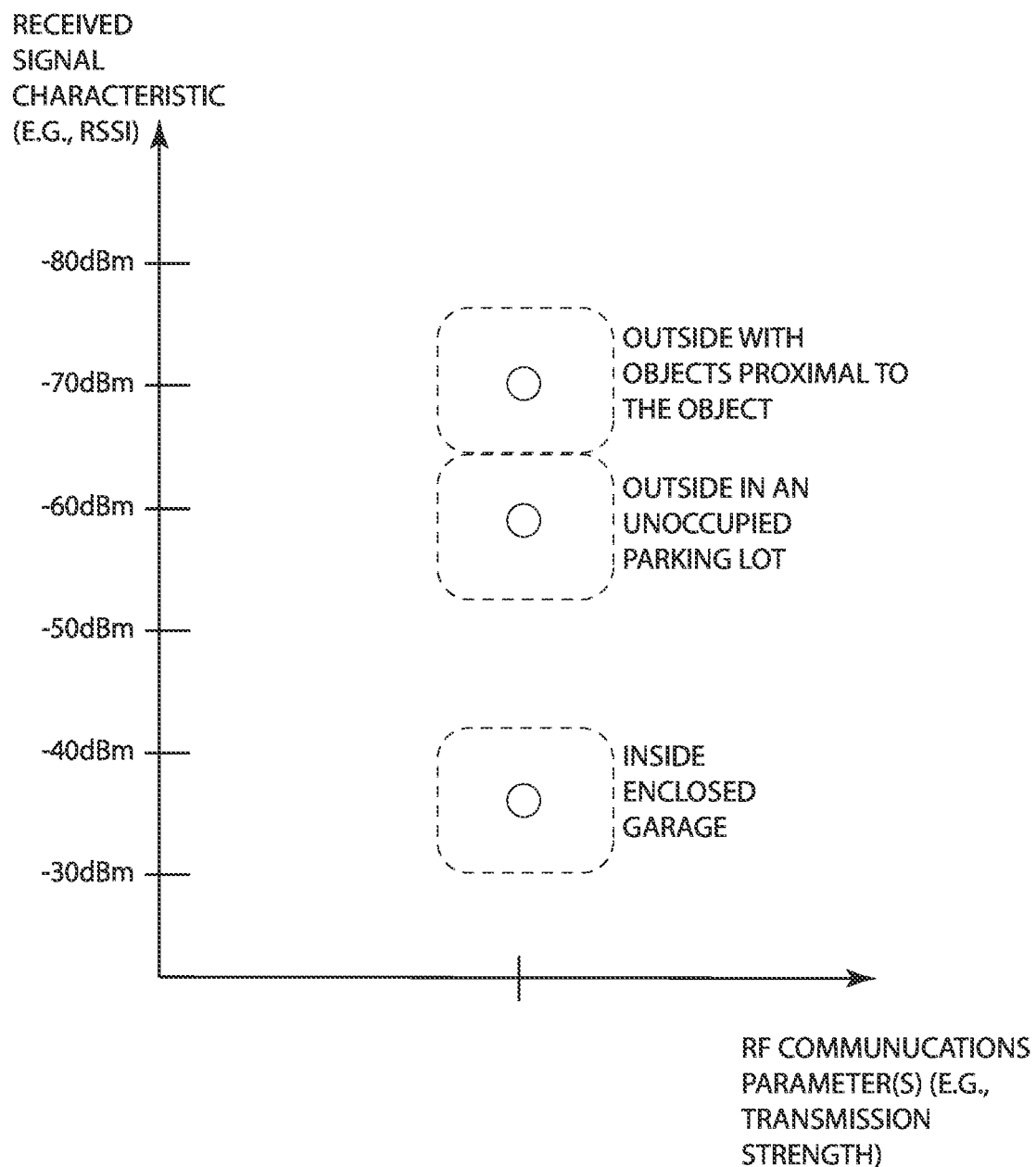
FIG. 10 shows a relationship between a type of environment and a received signal characteristic in accordance with one embodiment.

In the illustrated embodiment of FIG. 10, RSSI (the received signal characteristic) is shown having different values depending on the type of environment and its effects (e.g., reflections 141) on RF communications from the fixed position device. It is noted that the transmission parameters and RSSI may vary from application to application, and a type of environment may be determined within a degree of confidence for an RSSI provided as the received signal characteristic. The degree of confidence is noted by the phantom lines surrounding a truth data point for RSSI for a particular type of environment. For instance, the truth data point for an environment corresponding to an indoor enclosed garage is −36 dBm. In use, if RSSI is determined to be within 5 dBm of this value, the system 100 may determine the type of environment is an indoor enclosed garage (or an environment that effects RF communications in a similar manner as the indoor enclosed garage). Likewise, in use, if RSSI is determined to fall within the regions identified by environments corresponding to the object 10 being outside in an unoccupied parking lot or such a parking lot with objects proximal to the object 10, the system 100 may accordingly determine that the object 10 is in that type of environment (or an environment having a similar effect on RF communications). Step 1008. In one sense, the illustrated embodiment of FIG. 10 shows a fingerprint for different types of environments. The RSSI in the illustrated embodiment is obtained with respect to RF communications from a first fixed position device to a second fixed position device on the object 10. Similar fingerprints may be determined for reception of the RF communications in at least a third fixed position device so that multiple RSSIs for multiple fingerprints and associated confidence levels may be used as a basis for identifying the environment or a characteristic thereof. Likewise, reception of RF communications in the portable device 20 may be compared against fingerprints for various types of environments or characteristics thereof.

After determining the type of environment or a characteristic thereof, the method 1000 may include selecting a locator 210 corresponding to the type of environment or an adapter locator 310, as discussed herein, that facilitates determining location information for the type of environment. Step 1010. With the locator 210 and/or an adapter locator 310 being selected, the system 100 may proceed to determine location information based on RF communications received from the portable device 20, where the determination is tailored according to the type of environment in which the object 10 is located.

It is noted that in one embodiment, the truth data used as a basis for determining the type of environment in which the object 10 is disposed may be determined in the field based on user feedback or other parameters indicative of environment. For instance, the system may determine that the object 10 is disposed in an enclosed garage based on one or more criteria, such as activation of a barrier opening and the ignition being turned off (in this example the barrier may move from an open position to a closed position, and RSSI values may change accordingly over time). As discussed herein, the system 100 may determine an adapter locator 310 based on the truth data determined in the field.

IV. Adapter Locator

The system 100 in accordance with one embodiment may be configured to use an adapter locator 310 for determining location information with respect to a portable device 20. In one embodiment, the adapter locator 310 may be pre-determined for a type of an environment, a characteristic of an environment, or an environment similar to an environment for which the adapter locator 310 is pre-determined to operate.

Alternatively, the adapter locator 310 may be determined by the system 100 based on one or more samples obtained in use, including truth data for the object 10 and its environment. The truth data about the environment may be provided by a user or determined based on one or more criteria, such as GPS location information, connectivity to a Bluetooth device (e.g., the portable device 20), and a sequence of events (e.g., a barrier opening, ignition off, and disconnect of the Bluetooth device), or a combination thereof.

In one embodiment, the adapter locator 310 may be trained to adapt to the environment in which the object 10 is located based on RF communications transmitted from a first fixed position device disposed on or in a known location relative to the object 10. The RF communications received from the first fixed position device by the portable device or a second fixed position device may be correlated with a type of environment in which the object 10 is located to form truth information. This truth information may form the basis for generating an adapter locator 310 for a locator 210 of the system 100. It is noted that, in one embodiment, the environment's effect on RF communications transmitted from a portable device 20 are similar to the effects on RF communications transmitted from the first fixed position device. The adapter locator 310 may be trained to effect an output of the locator 210 to yield location information that is accurate within a degree of confidence for the environment.

Figure 13:
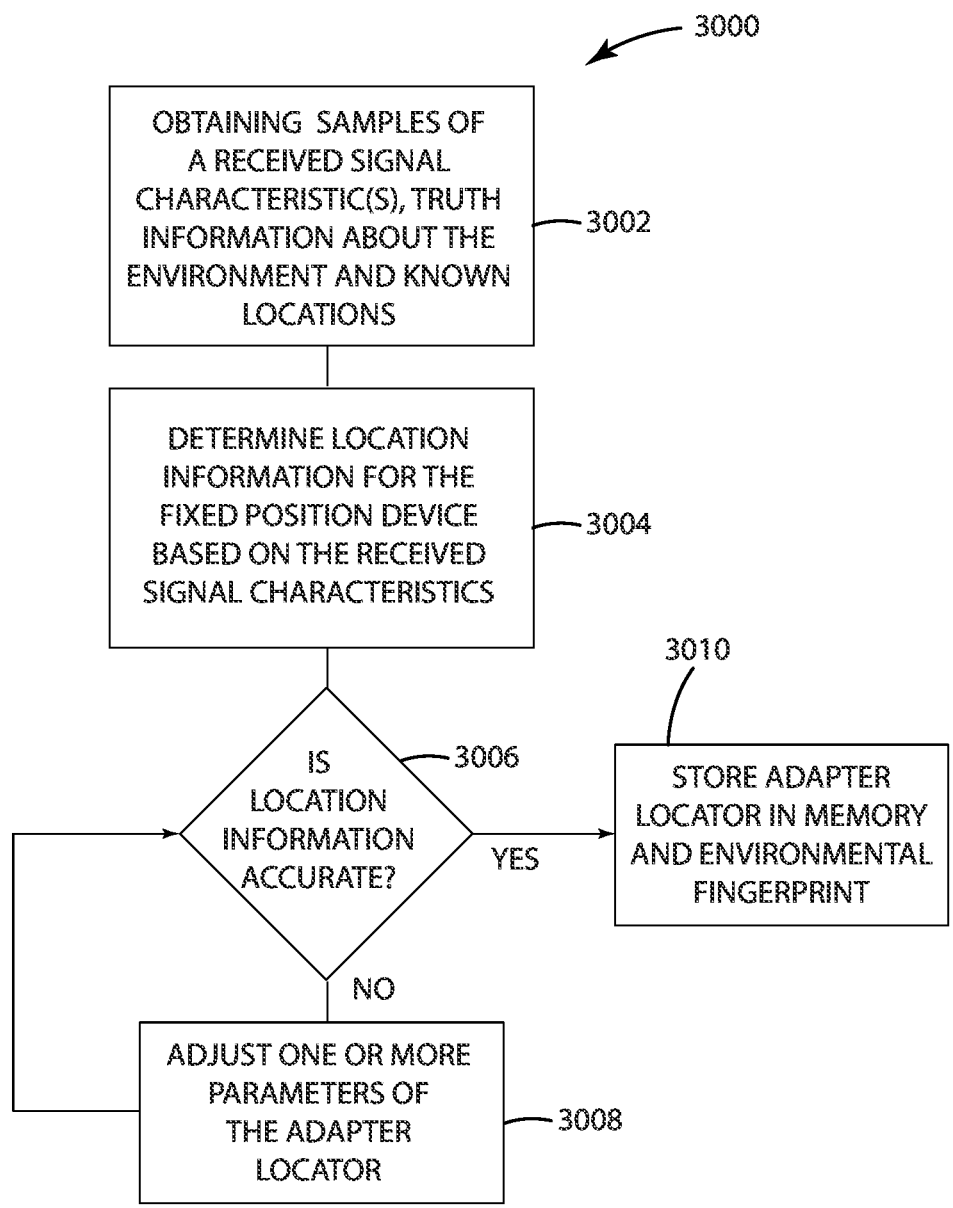
FIG. 13 shows a method of training an adapter locator in accordance with one embodiment.

A method of training an adapter locator 310 in accordance with one embodiment is shown in FIG. 13 and generally designated 3000. The method may include obtaining sample data and truth data for RF communications from the first fixed position device. The truth information may include one or more received signal characteristics with respect to the RF communications as received by a second fixed position device. The absolute or relative positions of the first and second fixed position devices may be known and provided as part of the truth data. Step 3002.

The method 3000 may include generating location information from the locator 210 for the first and second fixed position devices. Step 3002. One or more parameters of the locator 210 may be adjusted in this step to account for differences in determining a position of the first fixed position device relative to the object 10 rather than a position of the portable device 20 relative to the object 10. If the environment in which the object 10 is disposed has an effect on accuracy of the location information generated from the locator 210 for the first fixed position device, one or more parameters of the adapter locator 310 may be adjusted to affect the output of the locator 210 so that accuracy of the location information falls within an acceptable degree of confidence. Steps 3006, 3008. This process may be repeated until the accuracy is acceptable.

After the adapter locator 310 has been trained, it may be used in conjunction with the locator 210 to determine location information with respect to RF communications from the portable device 20 within the environment for which the adapter locator 310 has been trained, or an environment that affects RF communications in a similar manner. The received signal characteristic or characteristics that are indicative of the type of environment may be stored in memory and used in conjunction with the method 1000 to determine the type of environment and for selection of the trained adapter locator 310 in response to detection of the object 10 in the type of environment for which the adapter locator 310 is trained. It is noted that the one or more parameters adjusted for determining location information for the first fixed position device rather than the portable device 20 may be returned to their respective value for determining location information for the portable device 20 when the adapter locator 310 is used accordingly.

Figure 11:
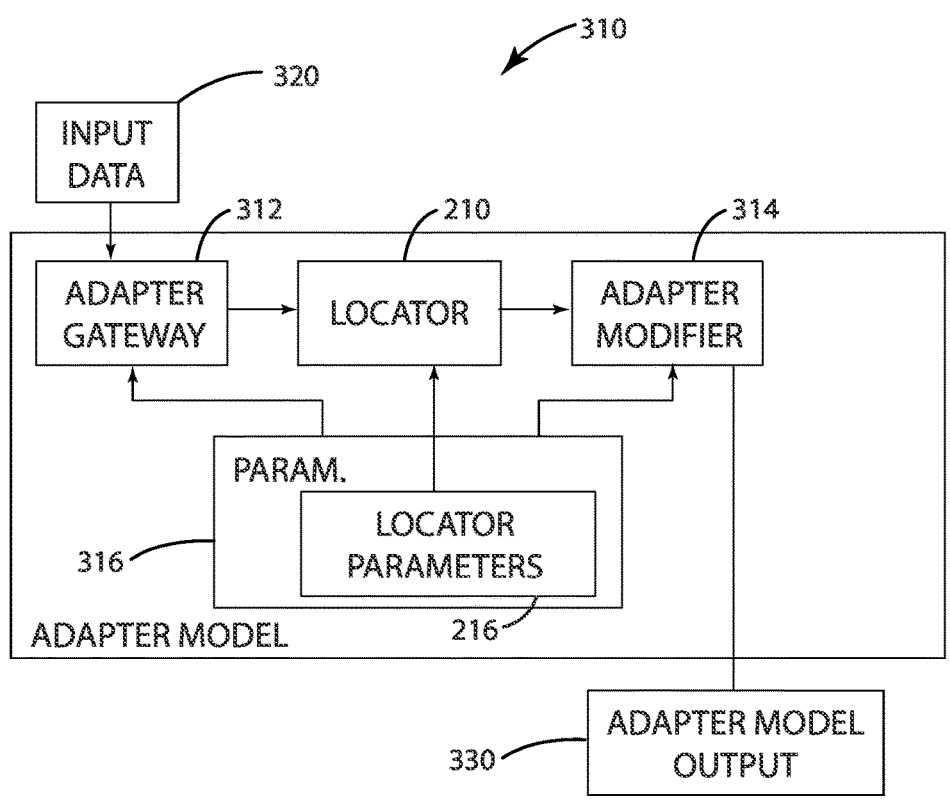
FIG. 11 shows an adapter locator in accordance with one embodiment.

An adapter locator 310 in accordance with one embodiment is shown FIG. 11. The adapter locator 310 may be configured to receive input data 320, such as one or more signal characteristics of communications between a portable device 20 and the object device 50 or the sensor 40, or a combination thereof. The input data 320 may be substantially similar to the type of data collected in the samples during training of the adapter locator 310, or provided as input data to the locator 210. The adapter locator 310 may be configured to provide adapter locator output 330 indicative of a location of the portable device 20 relative to the object 10 on which the object device 50 and/or the sensor 40 are disposed in a fixed relationship.

In one embodiment, the adapter locator 310 may include a parameter configuration 316 stored in memory. The parameter configuration 316 may include one or more parameters that are adjusted during training of the adapter locator 310 in accordance with the training data, including the plurality of samples and related truth data. The one or more parameters of the adapter locator 310 may be adjusted in accordance with the gradient descent optimization algorithm for maximizing a score of the adapter locator 310 so that the adapter locator output 330 aligns with the truth data within a degree of confidence. In one embodiment, the adapter locator 310 may be pre-defined or trained on a separate system such that the system 100 need not train the adapter locator 310 in the field for a type of environment determined with respect to the method 1000.

Optionally, at least one or more parameters of the parameter configuration 316 may correspond to at least one of the parameters 214 of the locator 210, as shown in phantom lines in FIG. 11. For instance, a first parameter of the locator 210 may be a global offset value of signal strengths of communications with respect to the portable device 20, and the locator 210 may be configured such that the global offset value is substantially zero. During training of the adapter locator 310, the global offset value may be adjusted to achieve a score for the adapter locator 310 that is considered acceptable or to achieve an adapter locator output 330 that performs within a threshold degree of confidence.

It is noted that the number of parameters controlled by the adapter locator 310 (e.g., the number of training parameters) may be significantly less than the number of parameters utilized by or in training the locator 210. As a result, it is possible that the adapter locator 310 may be performing in some circumstances or environments substantially similar to the locator 210 but not similar in other circumstances or environments. The training process may be configured to provide greater weight toward achieving performance for circumstances considered more influential in achieving an acceptable system 100 as a whole greater relative to circumstances considered less influential. For instance, accuracy at large distances may be weighed less than accuracy in close range to the object.

Optionally, the adapter locator 310 may include one or more of the following: an adapter gateway 312 configured to modify or adapt the input data 320 provided to the locator 210, and an adapter modifier 314 configured to modify or adapt the output received from the locator 210. The parameter configuration 316 stored in memory and associated with the adapter locator 310 may include one or more parameters associated with the adapter gateway 312 and the adapter modifier 314. Training of the adapter locator 310 may include adjusting the one or more parameters to achieve a performance score for the adapter locator 310 relative to the truth data for the tester device 300. The adapter gateway 312 may perform signal processing and/or data aggregation on the sensor data received by the adapter locator 312. Parameters may affect this signal processing and/or data aggregation. The adapter modifier 340 may be a post processor configured to affect an output of the locator. The adapter gateway 312 and/or the adapter modifier 314 may be integral to the locator or absent therefrom.

The adapter locator 310, as trained, in accordance with one embodiment may affect the system 100 to determine location information within the degree of confidence for the portable device 20. The adapter locator 310, as trained, in one embodiment may facilitate offsetting a signal strength characteristic of communications for one type of environment relative to an output from the locator 210 for another type of environment.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for determining location information pertaining to a location of a portable device relative to an object that is capable of being provided in a first environment and a second environment that is different from the first environment, the portable device being separable from the object and capable of being carried by a user, said system comprising:

a first receiver device disposed in a fixed position on the object, the first receiver device configured to receive first communications transmitted from at least one of a first transmitter device and the portable device according to a first wireless communication protocol, the first receiver device configured to sense a first signal characteristic with respect to the first communications received by the first receiver device and transmitted by the at least one of the first transmitter device and the portable device;

a second receiver device disposed in a fixed position on the object, the second receiver device configured to receive second communications transmitted from at least one of a second transmitter device and the portable device according to a second wireless communication protocol, the second receiver device configured to sense a second signal characteristic with respect to the second communications received by the second receiver device and transmitted by the at least one of the second transmitter device and the portable device, wherein the first wireless communication protocol is different from the second wireless communication protocol;

wherein the first wireless communication protocol is based on at least one of Bluetooth communications and Ultra Wideband communications, wherein the second wireless communication protocol is based on at least one of Bluetooth communications and Ultra Wideband communications; and a controller configured to determine location information about the portable device relative to the object, the controller including an environmental identifier configured to determine an environment of the object corresponds to one of the first environment and the second environment based on the first and second signal characteristics determined respectively based on the first and second communications transmitted according to different communication protocols, the controller including a first locator configured for the first environment of the object, the first locator configured to determine location information of the portable device relative to the object, the controller including a second locator configured for the second environment of the object, the second locator configured to determine location information of the portable device relative to the object, the controller configured to at least one of a) select one of the first locator and the second locator based on the environment, determined by the environmental identifier, corresponding to one of the first environment and the second environment and b) vary a numerical parameter of at least one of the first and second locators by increasing or decreasing the numerical parameter based on the environment, determined by the environmental identifier, corresponding to one of the first environment and the second environment, the controller configured to determine the location information about the portable device relative to the object based on output of at least one of the first and second locators.

2. The system of claim 1 wherein the first locator is configured to determine the location information based on the first signal characteristic.

3. The system of claim 2 wherein the second locator is configured to determine the location information based on the second signal characteristic.

4. The system of claim 1 comprising a first fixed position device disposed on the object, the first fixed position device including a first antenna configured to communicate wirelessly with the portable device via a communication link, the first fixed position device including the second transmitter device and the first receiver device, wherein the second transmitter device and the first receiver device are coupled to the first antenna to respectively transmit and receive communications according to the first wireless communication protocol.

5. The system of claim 4 wherein the first signal characteristic is one of a signal strength, time of flight, or angle of arrival of communications from the portable device to the first antenna.

6. The system of claim 4 wherein the first transmitter device and the first receiver device are provided as an integrated device in the first fixed position device.

7. The system of claim 4 comprising a second fixed position device disposed on the object, the second fixed position device including a second antenna configured to communicate wirelessly with the portable device via a communication link, the second fixed position device including the first transmitter device and the second receiver device, wherein the first transmitter device and the second receiver device are coupled to the second antenna to respectively transmit and receive communications according to the second wireless communication protocol.

8. The system of claim 7 wherein the second signal characteristic is one of a time-of-flight or signal strength of communications wirelessly transmitted between the portable device and the second antenna.

9. The system of claim 7 wherein the second transmitter device and the second receiver device are provided as an integrated device in the second fixed position device.

10. The system of claim 1 wherein the first wireless communication protocol is based on one of Bluetooth communications and Ultra Wideband communications, and wherein the second wireless communication protocol is based on the other of Bluetooth communications and Ultra Wideband communications.

11. The system of claim 1 wherein the first environment is different from the second environment based on presence or movement of another object in the first environment relative to the second environment.

12. The system of claim 1 wherein the first environment is different from the second environment based on a difference in electromagnetic reflectivity of the first environment relative to the second environment.

13. The system of claim 1 wherein a radio frequency (RF) reflectance of an environment in which the object is disposed varies dynamically in response to at least one of movement of the object from one environment to another and physical changes in the environment in which the object is disposed.

14. A method of determining location information pertaining to a location of a portable device relative to an object that is capable of being provided in a first environment and a second environment that is different from the first environment, the portable device being separable from the object and capable of being carried by a user, said method comprising:

receiving, in a first receiver device, first communications transmitted from at least one of a first transmitter device and the portable device according to a first wireless communication protocol;

generating a first signal characteristic with respect to the first communications transmitted from the at least one of the first transmitter device and the portable device;

receiving, in a second receiver device, second communications transmitted from at least one of a second transmitter device and the portable device according to a second wireless communication protocol;

generating a second signal characteristic with respect to the second communications transmitted from the at least one of the second transmitter device and the portable device;

determining an environment of the object corresponding to one of the first environment and the second environment based on the first and second signal characteristics determined respectively based on the first and second communications transmitted according to different communication protocols, wherein the first wireless communication protocol is based on at least one of Bluetooth communications and Ultra Wideband communications, wherein the second wireless communication protocol is based on at least one of Bluetooth communications and Ultra Wideband communications;

providing a first locator configured for the first environment of the object, the first locator configured to determine location information of the portable device relative to the object;

providing a second locator configured for the second environment of the object, the second locator configured to determine location information of the portable device relative to the object;

at least one of a) selecting one of the first locator and the second locator based on the determined environment corresponding to one of the first environment and the second environment and b) varying a numerical parameter of at least one of the first and second locators by increasing or decreasing the numerical parameter based on the determined environment corresponding to one of the first environment and the second environment; and determining the location of the portable device relative to the object based on an output of at least one of the first and second locators.

15. The method of claim 14 comprising determining, with the first locator, the location based on the first signal characteristic.

16. The method of claim 15 comprising determining, with the second locator, the location based on the second signal characteristic.

17. The method of claim 14 comprising providing a first fixed position device disposed on the object, wherein the first fixed position device includes a first antenna configured to communicate wirelessly with the portable device via a communication link, wherein the first fixed position device includes the second transmitter device and the first receiver device, and wherein the second transmitter device and the first receiver device are coupled to the first antenna to respectively transmit and receive communications according to the first wireless communication protocol.

18. The method of claim 17 wherein the first signal characteristic is one of a signal strength, time of flight, or angle of arrival of communications from the portable device to the first antenna.

19. The method of claim 17 comprising providing a second fixed position device disposed on the object, wherein the second fixed position device includes a second antenna configured to communicate wirelessly with the portable device via a communication link, wherein the second fixed position device includes the first transmitter device and the second receiver device, and wherein the first transmitter device and the second receiver device are coupled to the second antenna to respectively transmit and receive communications according to the second wireless communication protocol.

20. The method of claim 19 wherein the second signal characteristic is one of a time-of-flight or signal strength of communications wirelessly transmitted between the portable device and the second antenna.

21. The method of claim 14 wherein the first wireless communication protocol is based on one of Bluetooth communications and Ultra Wideband communications, and wherein the second wireless communication protocol is based on the other of Bluetooth communications and Ultra Wideband communications.

22. The method of claim 14 wherein the first environment is different from the second environment based on presence or movement of another object in the first environment relative to the second environment.

23. The method of claim 14 wherein the first environment is different from the second environment based on a difference in electromagnetic reflectivity of the first environment relative to the second environment.

24. The method of claim 14 wherein a radio frequency (RF) reflectance of an environment in which the object is disposed varies dynamically in response to at least one of movement of the object from one environment to another and physical changes in the environment in which the object is disposed.

25. The method of claim 14 wherein the first and second receiver devices are disposed in a sensor device responsive to both Ultrawide band communications and Bluetooth communications.

26. The system of claim 1 wherein the first and second receiver devices are disposed in a sensor device responsive to both Ultrawide band communications and Bluetooth communications.

27. The method of claim 14 wherein the first transmitter device and the second transmitter device are the same device.

* * * * *